(12) United States Patent
Matsumoto et al.

(10) Patent No.: US 9,992,446 B2
(45) Date of Patent: *Jun. 5, 2018

(54) IMAGE TRANSMISSION SYSTEM AND IMAGE TRANSMISSION METHOD

(71) Applicant: SONY CORPORATION, Tokyo (JP)

(72) Inventors: Hideyuki Matsumoto, Tokyo (JP); Tamotsu Ikeda, Tokyo (JP); Tetsuya Narita, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 136 days.

This patent is subject to a terminal disclaimer.

(21) Appl. No.: 15/054,095

(22) Filed: Feb. 25, 2016

(65) Prior Publication Data

US 2016/0173813 A1   Jun. 16, 2016

Related U.S. Application Data

(63) Continuation of application No. 13/772,644, filed on Feb. 21, 2013, now Pat. No. 9,294,735.

(30) Foreign Application Priority Data

Mar. 15, 2012   (JP) ................... 2012-058874

(51) Int. Cl.
*H04N 7/18*   (2006.01)
*H04N 7/12*   (2006.01)
(Continued)

(52) U.S. Cl.
CPC ............ *H04N 7/06* (2013.01); *H04N 5/225* (2013.01); *H04N 7/181* (2013.01); *H04N 19/00* (2013.01);
(Continued)

(58) Field of Classification Search
CPC ............ H04N 7/18; H04N 5/232; H04N 7/12
See application file for complete search history.

(56) References Cited

U.S. PATENT DOCUMENTS 5,995,140 A * 11/1999 Cooper ................. H04N 5/268
348/153
6,188,431 B1 * 2/2001 Oie ...................... H04N 1/2112
348/14.14
(Continued)

FOREIGN PATENT DOCUMENTS

JP   11-298977 A   10/1999
JP   2000-316112 A   11/2000
(Continued)

OTHER PUBLICATIONS

Office Action Received for Japanese Patent Application No. 2012-058874, dated Jan. 19, 2016, 8 pages of Office Action.

*Primary Examiner* — Sathyanaraya V Perungavoor
*Assistant Examiner* — Patricia I Young
(74) *Attorney, Agent, or Firm* — Chip Law Group

(57) ABSTRACT

Disclosed herein is an image transmission system including a plurality of cameras and a coaxial cable for transmitting image signals from the cameras, wherein: each of the cameras includes an imaging block configured to acquire an image signal by imaging an object, a coding block configured to compression-code the image signal through intra-frame compression and inter-frame compression so as to generate a coded signal, and a signal output block configured to output the coded signal onto the coaxial cable; and the camera of interest outputs the coded signal obtained through inter-frame compression onto the coaxial cable when another of the cameras outputs the coded signal obtained through intra-frame compression onto the coaxial cable.

13 Claims, 23 Drawing Sheets

(51) Int. Cl.
      *H04N 5/232*       (2006.01)
      *G11B 27/031*      (2006.01)
      *H04N 7/06*        (2006.01)
      *H04N 5/225*       (2006.01)
      *H04N 19/00*       (2014.01)
      *H04N 19/156*      (2014.01)
      *H04N 19/177*      (2014.01)

(52) U.S. Cl.
     CPC ......... *H04N 19/156* (2014.11); *H04N 19/177* (2014.11); *H04N 5/23203* (2013.01); *H04N 5/23206* (2013.01)

(56) References Cited

U.S. PATENT DOCUMENTS

| | | | | |
|---|---|---|---|---|
| 7,697,026 B2 * | 4/2010 | Vallone | ............... | G06K 9/00288 |
| | | | | 348/143 |
| 2010/0026810 A1 * | 2/2010 | Kajita | ............. | G08B 13/19676 |
| | | | | 348/159 |

FOREIGN PATENT DOCUMENTS

| | | | |
|---|---|---|---|
| JP | 2002-247408 | A | 8/2002 |
| JP | 2004-015318 | A | 1/2004 |
| JP | 2004-135200 | A | 4/2004 |
| JP | 2004-140651 | A | 5/2004 |
| JP | 2005-244803 | A | 9/2005 |
| JP | 2006-506896 | A | 2/2006 |
| JP | 2008-301146 | A | 12/2008 |
| JP | 2009-005315 | A | 1/2009 |
| JP | 2009-049577 | A | 3/2009 |
| JP | 2012-147107 | A | 8/2012 |

\* cited by examiner

IMAGE TRANSMISSION SYSTEM AND IMAGE TRANSMISSION METHOD

BACKGROUND

The present technology relates to an image transmission system and an image transmission method. More particularly, the technology relates to an image transmission system and an image transmission method for preventing delays and stoppages of image transmission while reducing transmission load.

Heretofore, most surveillance camera systems have had surveillance cameras obtain image signals and had the images transmitted as analog signals to a camera control unit (called the CCU herein) via coaxial cables. This type of analog transmission setups has been extensively utilized. Inside the typical facility where the surveillance camera system is installed, the cables have been laid in every corner of the compound.

In recent years, there has been a need for image quality enhancement through digitization. However, the cost involved has turned out to be inordinately high when the densely laid cables inside the facility need to be replaced with new ones.

Given such high costs, techniques have been proposed to let digital signals be transmitted via the existing coaxial cables of the image transmission system.

Meanwhile, there are cases where the surveillance camera system includes a plurality of cameras that transmit their image signals over a single cable.

FIG. 1 shows a typical configuration of an image transmission system in which image signals from a plurality of cameras are transmitted via a coaxial cable.

In the image transmission system of FIG. 1, cameras 1-1 through 1-3 are interconnected with one another via a hub 2 using Ethernet cables. The hub 2 is connected to a modem 3. The cameras 1-1 through 1-3 acquire moving images and have them compression-coded in MPEG (Moving Picture Experts Group) format into image signals that are transmitted to a CCU 5 via the hub 2, modem 3, and coaxial cable 4. The CCU 5 transmits control signals that control the cameras 1-1 through 1-3 to these cameras via the coaxial cable 4, modem 3, and hub 2. As needed, the cameras 1-1 through 1-3 may transmit to the CCU 5 control signals corresponding to the control signals from the CCU 5, along with the image signals. The image signals transmitted to the CCU 5 are forwarded to a recording device and/or a reproduction device, not shown, for recording and/or reproduction (display).

The coded signals obtained through compression coding by the cameras 1-1 through 1-3 are each composed of a GOP (Group of Pictures) formed by an I-picture, a P-picture and a B-picture. The I-picture is a body of data made up of one frame of image information. The P-picture and B-picture are each a body of data formed by the difference in information between the preceding and the following frames. The data amount of the I-picture is significantly larger than that of the P-picture or B-picture. Thus there occurs periodically a peak of transmission load during image transmission every time the I-picture is transmitted from each of the cameras 1-1 through 1-3.

If the timings of I-picture transmission from the cameras 1-1 through 1-3 overlap with one another as shown on the left-hand side in FIG. 2, the transmission load on the coaxial cable 4 at each overlapping point in time rises prominently in pulsating fashion as indicated on the right-hand side in the same drawing. This can lead to the transmission load exceeding the maximum allowable transmission capacity of the coaxial cable 4.

The transmission load is typically prevented from overflowing the maximum allowable transmission capacity by having the transmitted signals being temporarily retained in a buffer attached to the modem 3. However, there remains a possibility that delays and stoppages of image transmission may still occur.

Meanwhile, there exists a technology whereby a single image is split into a plurality of image objects when coded and whereby the generation timings of the I-pictures of these image objects are adjusted to not overlap with one another temporally (e.g., see Japanese Patent Laid-open No. Hei 10-23427.

SUMMARY

However, the image transmission systems typified by the one shown in FIG. 1 have no such technology for adjusting the generation timings of the I-pictures from the cameras 1-1 through 1-3. It has thus been difficult to prevent delays and stoppages of image transmission while reducing transmission load.

The present technology has been made in view of the above circumstances and provides innovative arrangements for preventing delays and stoppages of image transmission while reducing transmission load.

According to one embodiment of the present technology, there is provided an image transmission system including a plurality of cameras and a coaxial cable for transmitting image signals from the cameras. Each of the cameras includes: an imaging block configured to acquire an image signal by imaging an object; a coding block configured to compression-code the image signal through intra-frame compression and inter-frame compression so as to generate a coded signal; and a signal output block configured to output the coded signal onto the coaxial cable. The camera of interest outputs the coded signal obtained through inter-frame compression onto the coaxial cable when another of the cameras outputs the coded signal obtained through intra-frame compression onto the coaxial cable.

Preferably, one of the cameras may further include a synchronous signal generation block configured to generate a synchronous signal to be transmitted to the other cameras. The other cameras may each include an output timing control block configured to control signal output timing in such a manner that the coded signal obtained through intra-frame compression is output onto the coaxial cable upon elapse of a predetermined time period following receipt of the synchronous signal from that one camera.

Preferably, one of the cameras may further include a selection signal generation block configured to generate a selection signal for selectively allowing another of the cameras to output the coded signal obtained through intra-frame compression onto the coaxial cable. The other cameras may each include an output control block configured to control signal output in such a manner that the coded signal obtained through intra-frame compression is output onto the coaxial cable upon receipt of the selection signal from that one camera.

Preferably, each of the cameras may include: an output control block configured to perform output control in such a manner that upon receipt of a selection signal from another of the cameras for selectively allowing the camera of interest to output the coded signal obtained through intra-frame compression onto the coaxial cable, the coded signal obtained through intra-frame compression is output onto the coaxial cable, and a selection signal generation block configured to generate the selection signal for selectively allowing still another of the cameras to output the coded signal obtained through intra-frame compression onto the coaxial cable.

Preferably, each of the cameras may include: an output detection block configured to detect the output by another of the cameras of the coded signal obtained through intra-frame compression onto the coaxial cable, and an output control block configured to control signal output in such a manner that when the output by another of the cameras of the coded signal obtained through intra-frame compression onto the coaxial cable is not detected, the coded signal obtained through intra-frame compression is output onto the coaxial cable.

Preferably, the coding block may generate the coded signal composed of an I-picture, a P-picture, and a B-picture by compression-coding the image signal in MPEG (Moving Picture Experts Group) format, and the camera of interest may output either the P-picture or the B-picture onto the coaxial cable when another of the cameras outputs the I-picture onto the coaxial cable.

According to another embodiment of the present technology, there is provided an image transmission method for use with an image transmission system including a plurality of cameras and a coaxial cable for transmitting image signals from the cameras. Each of the cameras includes: an imaging block configured to acquire an image signal by imaging an object; a coding block configured to compression-code the image signal through intra-frame compression and inter-frame compression so as to generate a coded signal; and a signal output block configured to output the coded signal onto the coaxial cable. The image transmission method includes causing the camera of interest to output the coded signal obtained through inter-frame compression onto the coaxial cable when another of the cameras outputs the coded signal obtained through intra-frame compression onto the coaxial cable.

According to the present technology embodied as outlined above, the camera of interest outputs the coded signal obtained through inter-frame compression onto the coaxial cable when another camera outputs the coded signal obtained through intra-frame compression onto the coaxial cable.

The technique of the present technology thus makes it possible to prevent delays and stoppages of image transmission while reducing transmission load.

BRIEF DESCRIPTION OF THE DRAWINGS

Further features and advantages of the present technology will become apparent upon a reading of the following description and appended drawings in which.

DETAILED DESCRIPTION OF THE PREFERRED EMBODIMENTS

Some preferred embodiments of the present technology are explained below in reference to the accompanying drawings.

[Structure of the Image Transmission System]

Figure 1:
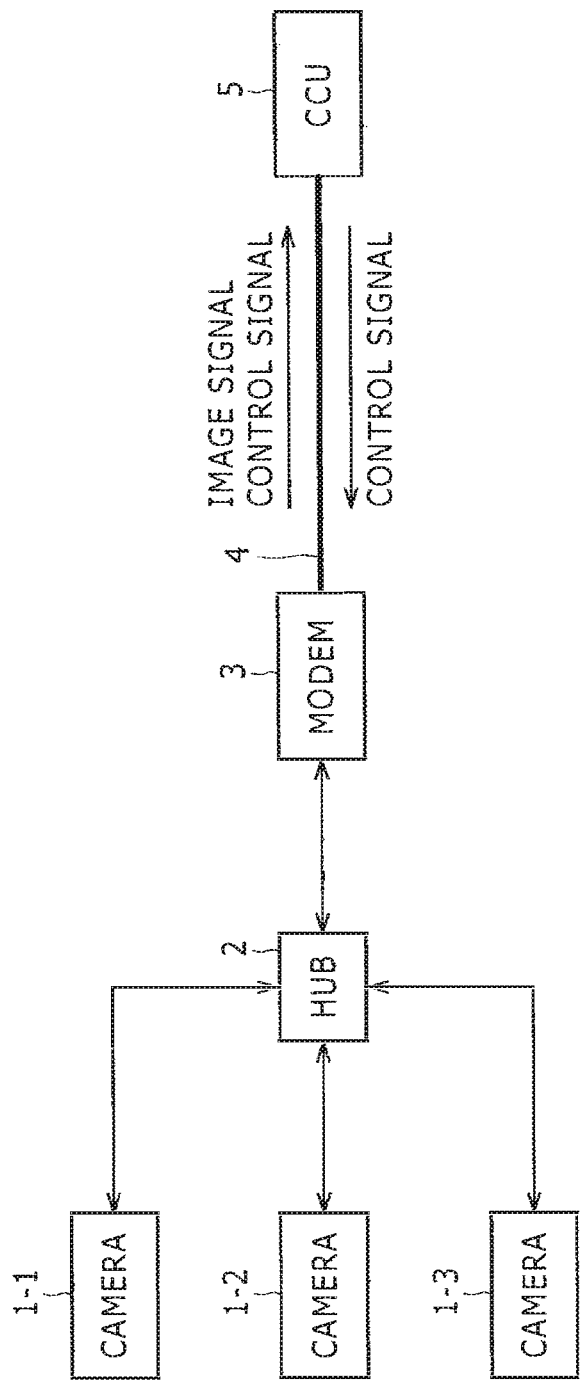
FIG. 1 is a block diagram showing the configuration of an ordinary image transmission system.
Figure 2:
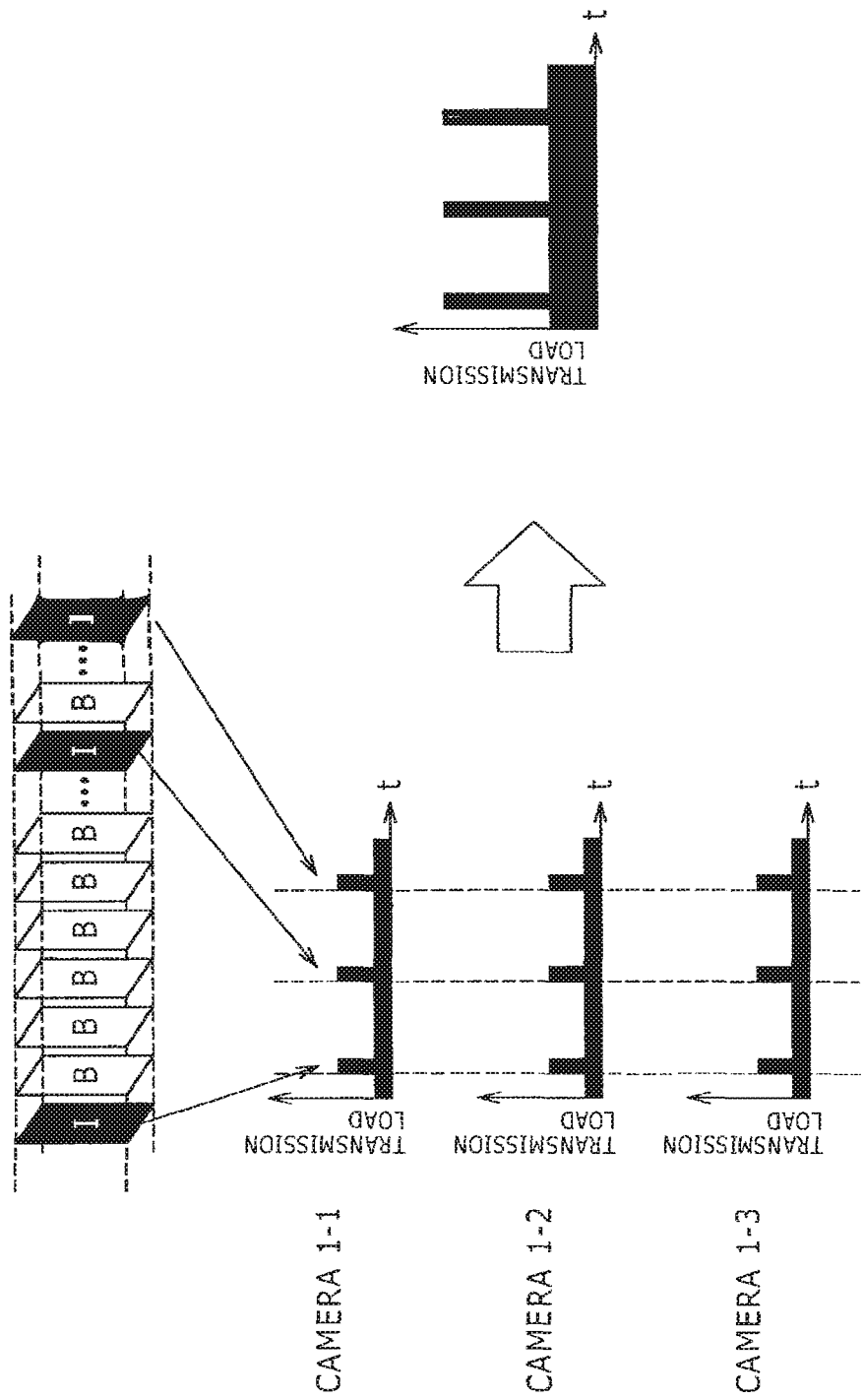
FIG. 2 is an explanatory view explaining the transmission load of the ordinary image transmission system.
Figure 3:
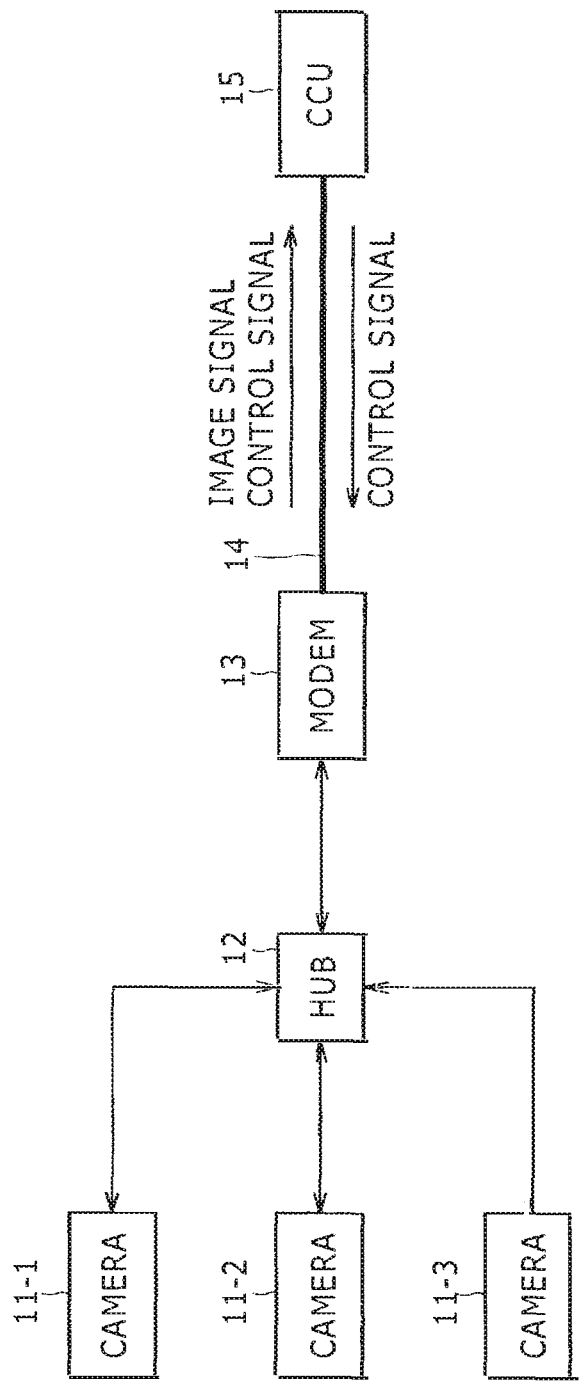
FIG. 3 is a block diagram showing a typical configuration of an image transmission system embodying the present technology.

FIG. 3 is a block diagram showing a typical configuration of an image transmission system embodying the present technology. The image transmission system shown in FIG. 3 is configured as a surveillance camera system that includes surveillance cameras 11-1 through 11-3 as imaging devices (simply called the cameras 11-1 through 11-3 herein), a hub 12, a modem 13, a coaxial cable 14 for transmitting signals, and a CCU 15 for controlling the cameras 11-1 through 11-3.

In the image transmission system of FIG. 3, the cameras 11-1 through 11-3 are interconnected via the hub 12 using Ethernet cables. The hub 12 is connected to the modem 13. The cameras 11-1 through 11-3 acquire moving images and have them compression-coded in MPEG (Moving Picture Experts Group) format into image signals that are transmitted to the CCU 15 via the hub 12, modem 13, and coaxial cable 14. The CCU 15 transmits packets containing control signals that control the cameras 11-1 through 11-3, to these cameras via the coaxial cable 14, modem 13, and hub 12. As needed, the cameras 11-1 through 11-3 may transmit to the CCU 15 control signals corresponding to the control signals from the CCU 15, along with the image signals.

Specifically, where communication is performed between the modem 13 and the CCU 15 under the protocol TCP/IP (Transmission Control Protocol/Internet Protocol), the cameras 11-1 through 11-3 each output an ACK (acknowledgment signal) to the CCU 15 as a control signal acknowledging the control signal from the CCU 15. As with the control signal from the CCU 15, the ACK is structured as a packet that includes information acknowledging receipt by the camera of the packet from the CCU 15 and information acknowledging receipt by the camera of the control signal (i.e., content of the packet) from the CCU 15.

The image signals transmitted to the CCU 15 are forwarded to a recording device and/or a reproduction device, not shown, for recording and/or reproduction (display).

The coded signals obtained through compression coding by the cameras 11-1 through 11-3 are each composed of a GOP (Group of Pictures) including an I-picture, a P-picture, and a B-picture.

Figure 4:
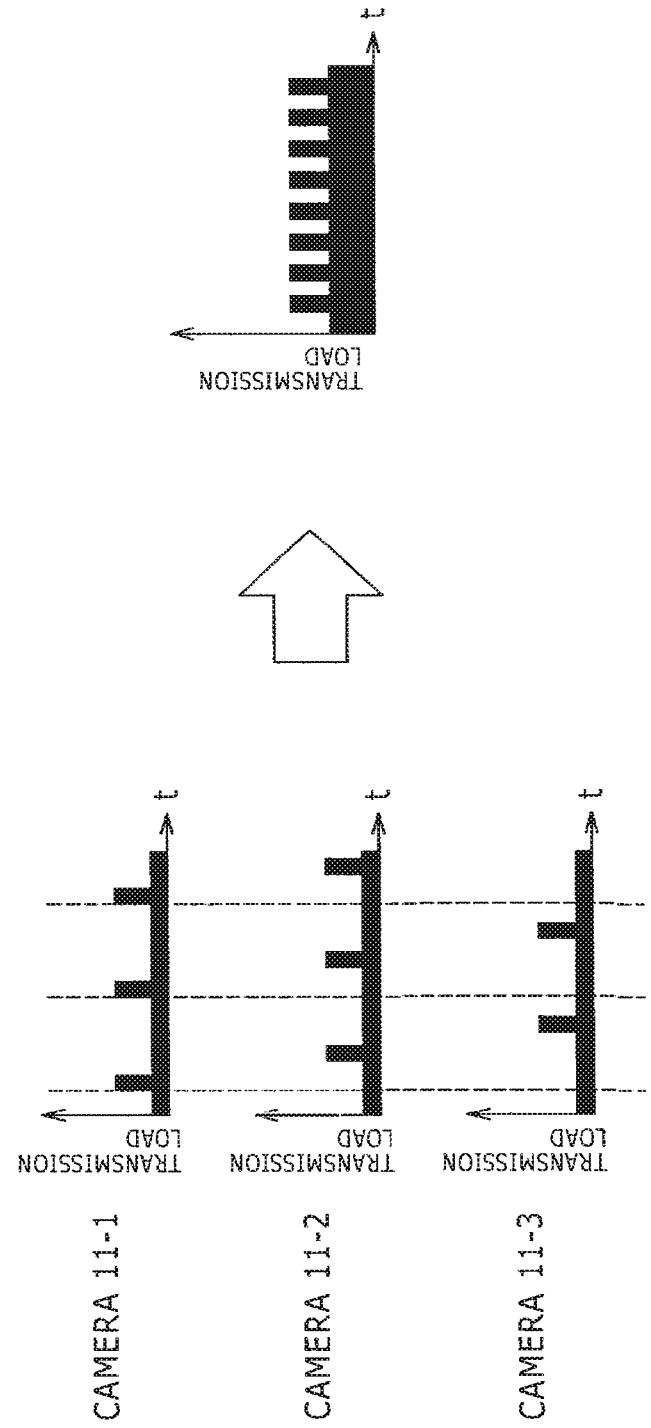
FIG. 4 is an explanatory view explaining the transmission load of the image transmission system embodying the present technology.

In the image transmission system of FIG. 3, the transmission timings of the I-pictures from the cameras 11-1 through 11-3 are controlled so as not to overlap with one another as shown on the left-hand side in FIG. 4. Specifically, each of the cameras 11-1 through 11-3 outputs the P-picture or B-picture onto the coaxial cable 14 when any other camera outputs the I-picture onto the coaxial cable 14. This flattens the transmission load on the coaxial cable 14 without incurring pulsating fluctuations, as shown on the right-hand side in FIG. 4.

As a result, the transmission load on the coaxial cable 14 does not exceed the maximum allowable transmission capacity of the coaxial cable 14, with no need to provide the modem 13 with a buffer. Thus it is possible to prevent delays and stoppages of image transmission while reducing transmission load.

Explained below are some embodiments of the image transmission system to which this technology is applied.

Figure 5:
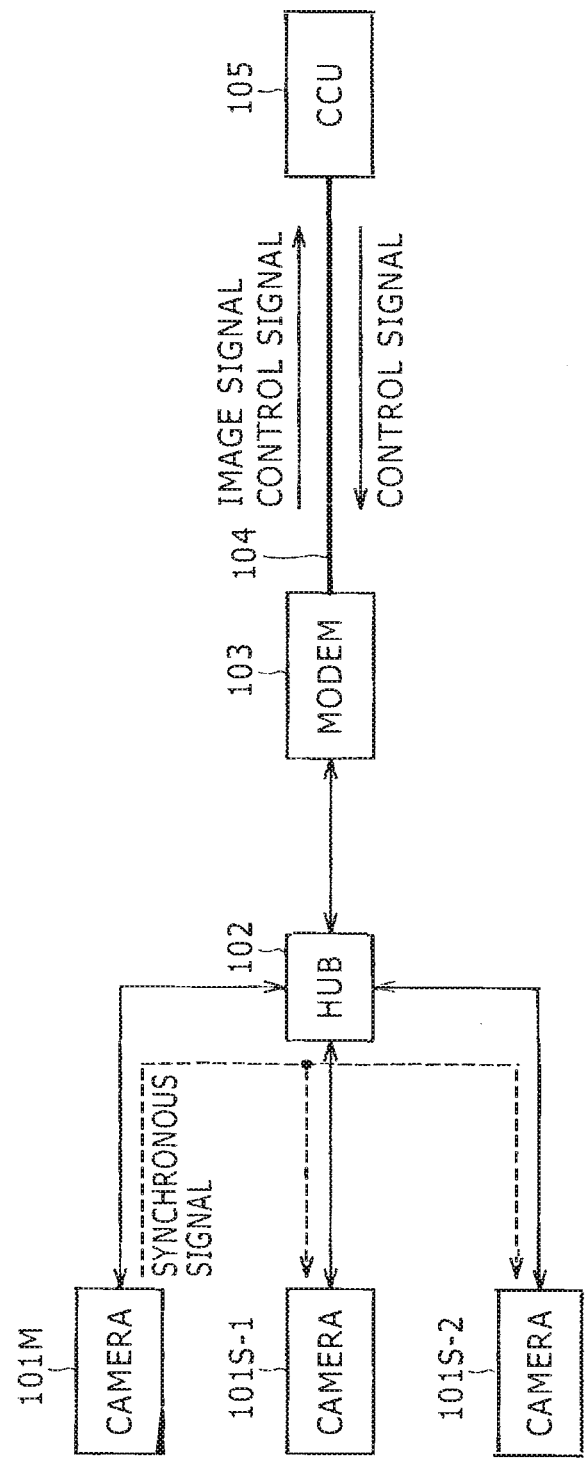
FIG. 5 is a block diagram showing a typical configuration of an image transmission system as a first embodiment of the present technology.

<First Embodiment>
[Typical Configuration of the Image Transmission System]
FIG. 5 is a block diagram showing a typical configuration of an image transmission system as the first embodiment of the present technology. The image transmission system in FIG. 5 is made up of cameras 101M, 101S-1 and 101S-2, a hub 102, a modem 103, a coaxial cable 104, and a CCU 105.

The cameras 101M, 101S-1 and 101S-2, hub 102, modem 103, coaxial cable 104, and CCU 105 constituting the image transmission system in FIG. 5 operate basically in the same manner as the cameras 11-1 through 11-3, hub 12, modem 13, coaxial cable 14, and CCU 15 making up the image transmission system in FIG. 3, respectively.

It should be noted that the camera 101M generates a synchronous signal and sends it to the cameras 101S-1 and 101S-2. The cameras 101S-1 and 101S-2 each control image signal output timing in such a manner that the I-picture is output onto the coaxial cable 104 upon elapse of a predetermined time period following receipt of the synchronous signal from the camera 101M.

Figure 6:
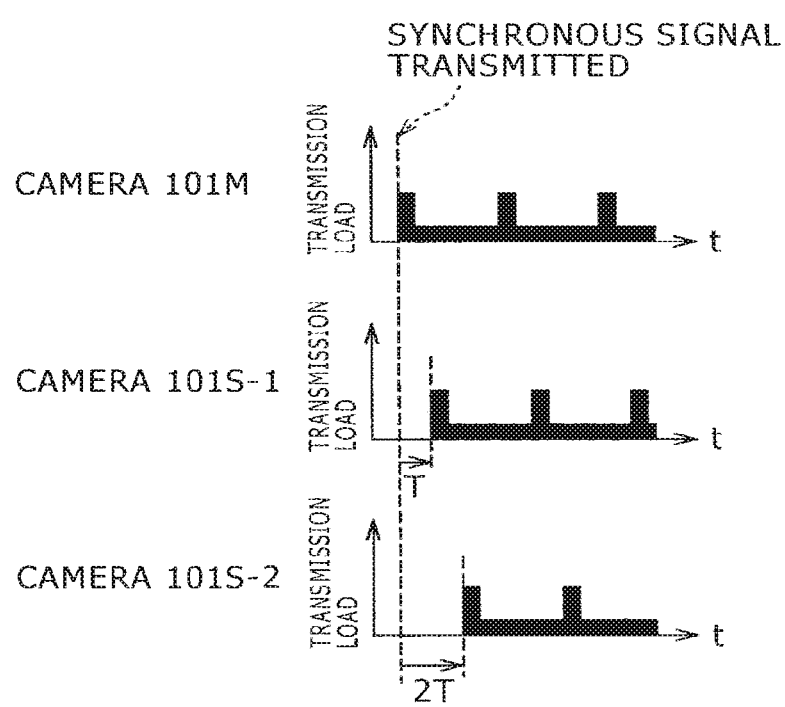
FIG. 6 is an explanatory view explaining the transmission load of the image transmission system shown in FIG. 5.

Specifically, as shown in FIG. 6, the camera 101M generates the synchronous signal at the same time that it starts outputting an image signal (i.e., the moment the I-picture as the data heading the coded signal is output) and transmits the generated signal to the cameras 101S-1 and 101S-2. The camera 101S-1 starts outputting its image signal upon elapse of a predetermined time period T following receipt of the synchronous signal from the camera 101M. The camera 101S-2 starts outputting its image signal upon elapse of a predetermined time period 2T following receipt of the synchronous signal from the camera 101M.

As described, the camera 101M operates as the master and the cameras 101S-1 and 101S-2 function as slaves in the image transmission system of FIG. 5. In this manner, the transmission timings of the I-pictures from the cameras 101M, 101S-1 and 101S-2 are controlled so as not to overlap with one another. It is assumed here that the cameras 101M, 101S-1 and 101S-2 have an identical transmission cycle of the I-picture each (i.e., the picture sequence in the GOP is identical).

In the ensuing description, the cameras 101S-1 and 101S-2 will be generically referred to as the camera 101S if there is no need to distinguish the cameras from one another. Likewise, the cameras 101M and 101S will be generically referred to as the camera 101 if there is no need to distinguish these cameras from one another.

[Typical Structure of the Camera]
The typical structure of the camera 101 is explained below in reference to FIGS. 7 and 8. In the camera 101 shown in FIGS. 7 and 8, the structure for receiving control signals from the CCU 105 is not shown, and the description of the structure is omitted herein.

Figure 7:
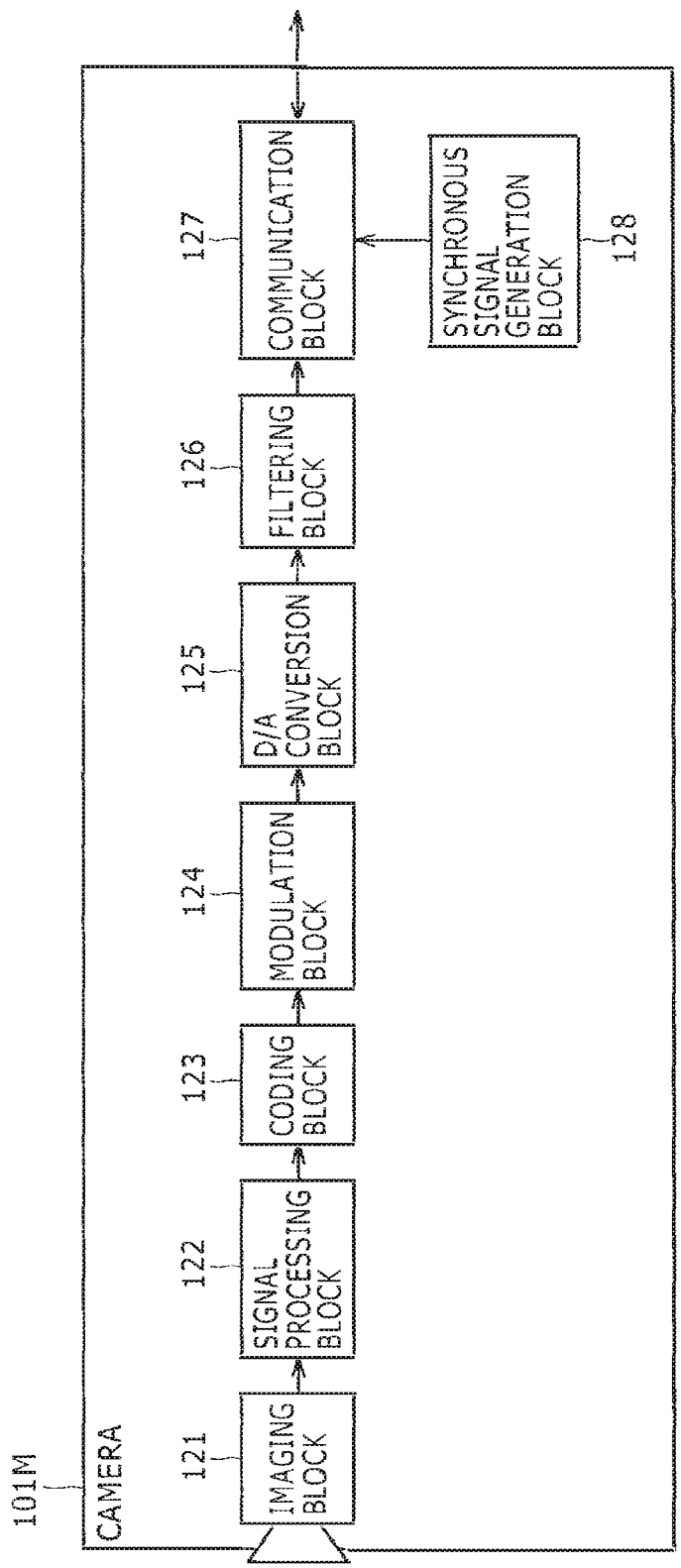
FIG. 7 is a block diagram showing the structure of a camera.

FIG. 7 shows a typical structure of the camera 101M indicated in FIG. 5.

The camera 101M in FIG. 7 is made up of an imaging block 121, a signal processing block 122, a coding block 123, a modulation block 124, a D/A conversion block 125, a filtering block 126, a communication block 127, and a synchronous signal generation block 128.

The imaging block 121 takes an image of an object by having the light from the object focused through a lens arrangement for entry into an image sensor such as a CCD (charge coupled device) image sensor. The imaging block 121 then obtains an image signal by subjecting the light entering the image sensor to photoelectric conversion followed by such processes as correlated square sampling, gain control, and A/D (analog to digital) conversion. The imaging block 121 supplies the image signal thus acquired to the signal processing block 122.

The signal processing block 122 subjects the image signal from the imaging block 121 to signal processing such as a defect correction process, an image quality correction process, and a color space conversion process. The signal processing block 122 supplies the image signal having undergone the signal processing to the coding block 123.

The coding block 123 compression-codes the image signal from the signal processing block 122 through intra-frame compression and inter-frame compression, and supplies the resulting coded signal (coded stream) to the modulation block 124. Specifically, the coding block 123 compression-codes the image signal from the signal processing block 122 in MPEG format, thereby generating a coded stream of GOPs each composed of the I-picture, P-picture and B-picture.

The modulation block 124 modulates the coded signal from the coding block 123 using the OFDM (Orthogonal Frequency Division Multiplexing) method, and supplies the coded signal thus modulated to the D/A conversion block 125.

The D/A conversion block 125 subjects the modulated signal from the modulation block 124 to D/A (digital to analog) conversion, and supplies the converted signal to the filtering block 126.

The filtering block 126 performs band limitation by extracting solely a predetermined frequency band component from the signal coming from the D/A conversion block 125, and supplies the resulting signal to the communication block 127.

The communication block 127 outputs the signal from the filtering block 126 onto the coaxial cable 104 via the hub 102 and modem 103, and performs communication with other cameras 101 via the hub 102.

The synchronous signal generation block 128 generates the synchronous signal to be transmitted to the other cameras 101, and causes the communication block 127 to transmit the generated synchronous signal.

Figure 8:
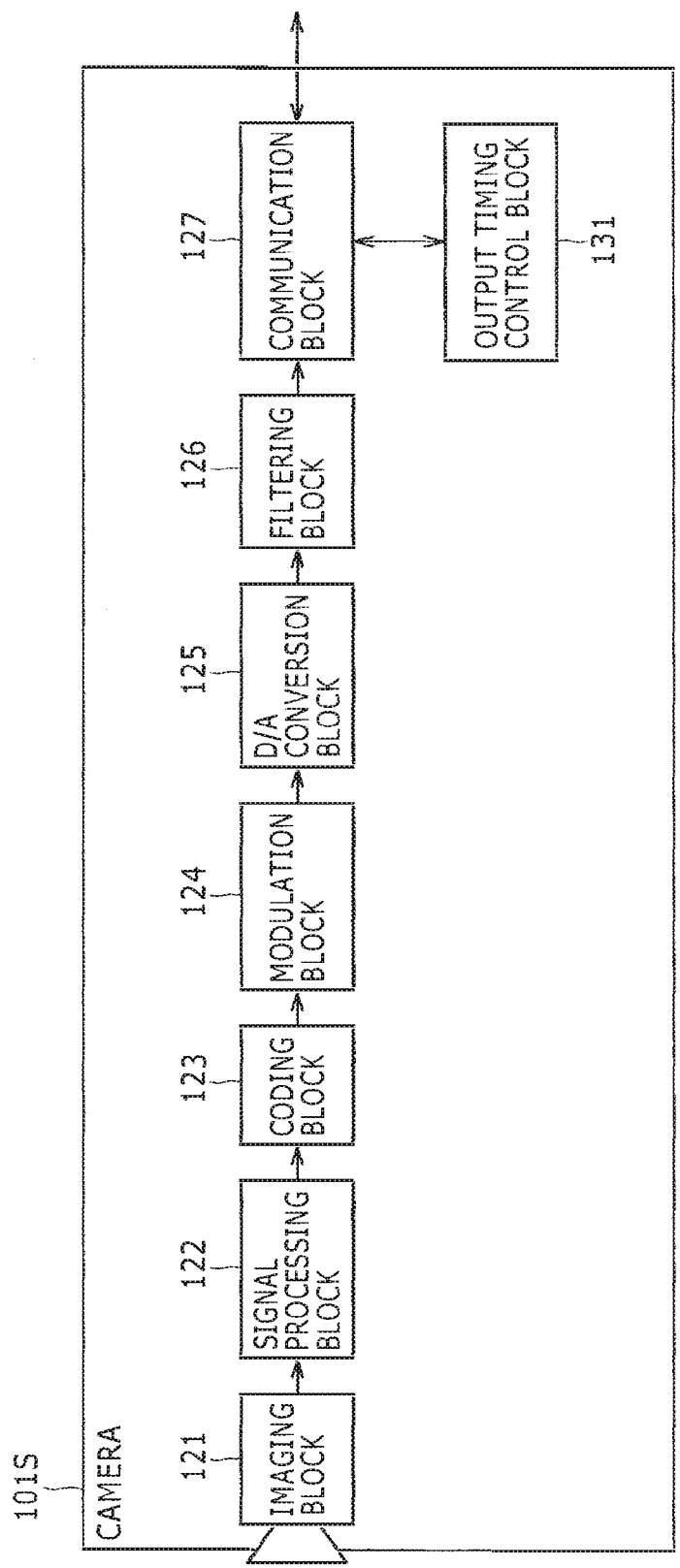
FIG. 8 is a block diagram showing the structure of another camera.

FIG. 8 shows a typical structure of the camera 101S indicated in FIG. 5.

The camera 101S in FIG. 8 is made up of an imaging block 121, a signal processing block 122, a coding block 123, a modulation block 124, a D/A conversion block 125, a filtering block 126, a communication block 127, and an output timing control block 131.

Of the components making up the camera 101S in FIG. 8, those offering the same functions as in the camera 101M of FIG. 7 are designated by the same names and reference numerals, and explanations of these components are omitted herein where redundant.

That is, what makes the camera 101S in FIG. 8 different from the camera 101M in FIG. 7 is that the synchronous signal generation block 128 in the camera 101M is replaced with the output timing control block 131 in the camera 101S.

The output timing control block 131 controls the output timing of the I-picture in such a manner that the I-picture is output onto the coaxial cable 104 upon elapse of a predetermined time period following receipt by the communication block 127 of the synchronous signal from the camera 101M.

[Image Transmission Process]

Figure 9:
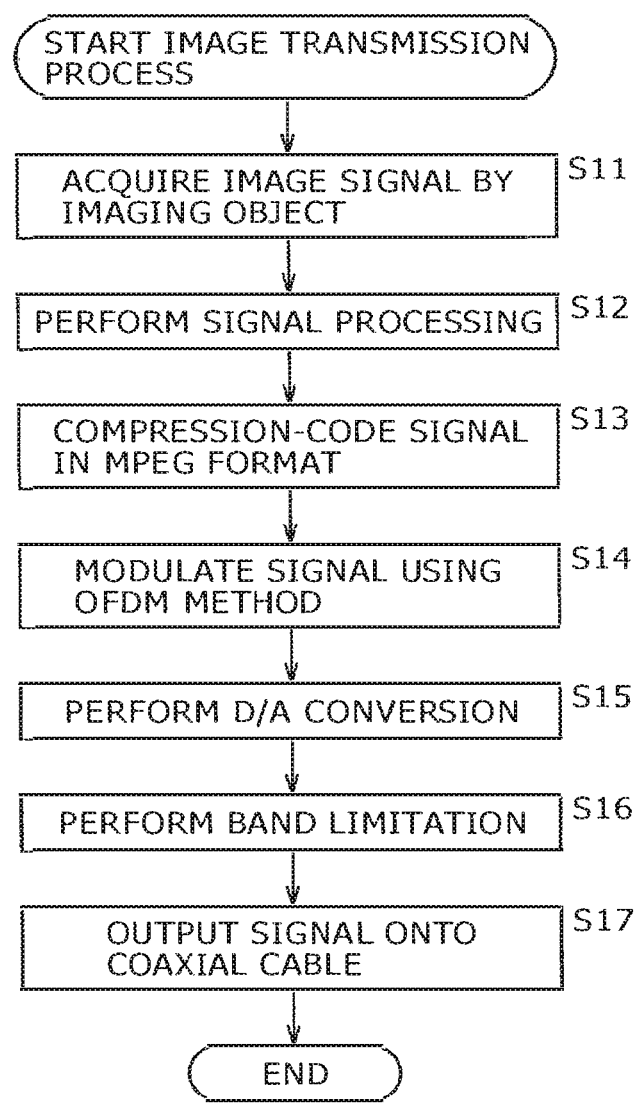
FIG. 9 is a flowchart explaining an image transmission process performed by the camera.

The image transmission process performed by the camera 101 is explained below in reference to the flowchart of FIG. 9.

In step S11, the imaging block 121 obtains an image signal by imaging an object, and supplies the image signal to the signal processing block 122.

In step S12, the signal processing block 122 subjects the image signal from the imaging block 121 to diverse signal processing, and supplies the image signal having undergone the signal processing to the coding block 123.

In step S13, the coding block 123 compression-codes the image signal from the signal processing block 122 in MPEG format so as to generate a coded signal composed of the I-picture, P-picture and B-picture. The coding block 123 supplies the coded signal thus generated to the modulation block 124.

In step S14, the modulation block 124 modulates the coded signal from the coding block 123 using the OFDM method, and supplies the modulated signal to the D/A conversion block 125.

In step S15, the D/A conversion block 125 subjects the modulated signal from the modulation block 124 to D/A conversion, and supplies the converted signal to the filtering block 126.

In step S16, the filtering block 126 performs band limitation by extracting only a predetermined frequency band component from the signal coming from the D/A conversion block 125, and supplies the resulting signal to the communication block 127.

In step S17, the communication block 127 outputs the signal from the filtering block 126 onto the coaxial cable 104 via the hub 102 and modem 103.

The foregoing paragraphs explained the image transmission process performed by each camera 101. What follows is an explanation of the flow of the processing taking place in the image transmission system of FIG. 5 made up of the cameras 101M and 101S.

[Flow of Processing in the Image Transmission System]

Figure 10:
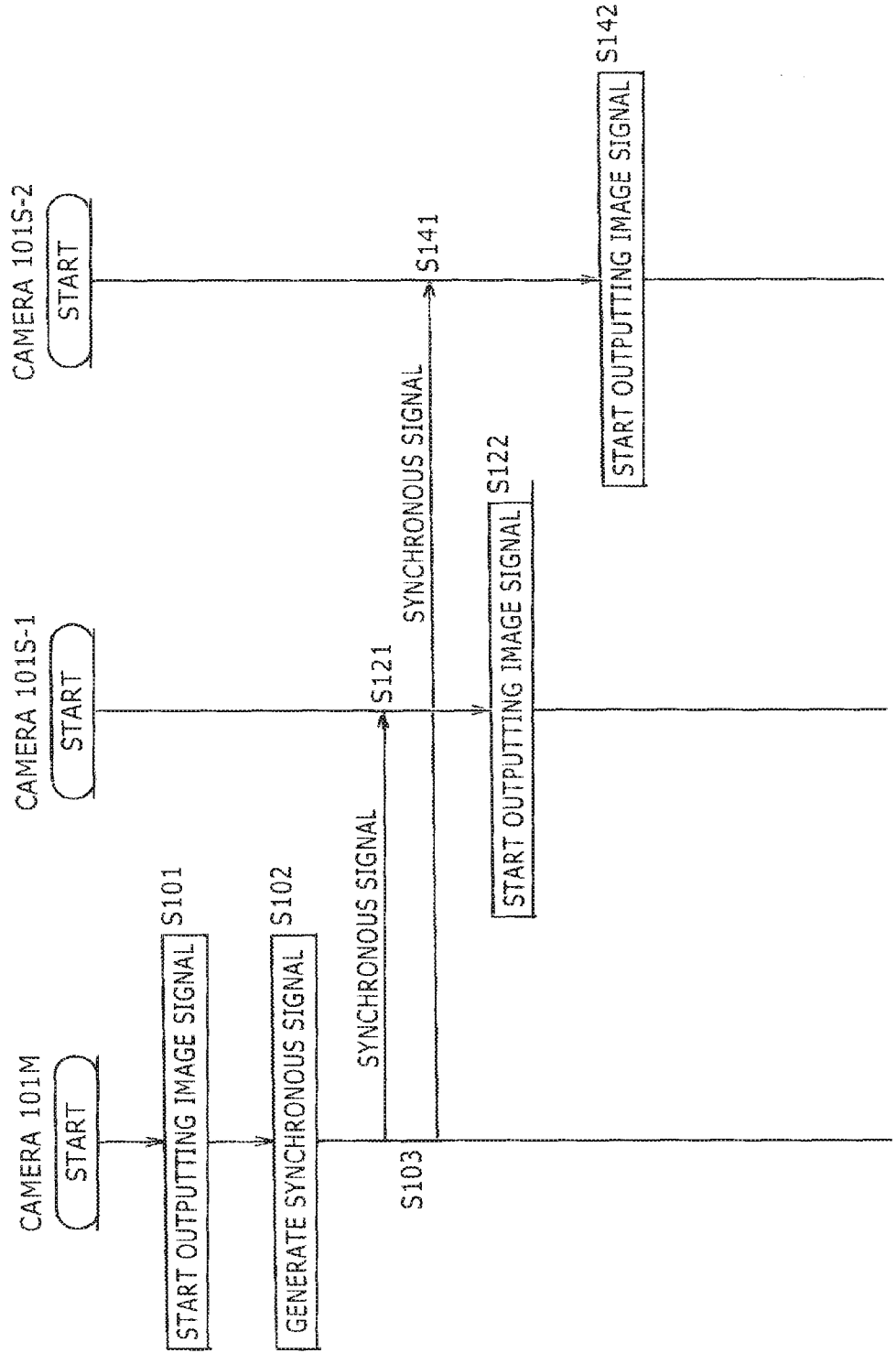
FIG. 10 is an arrow chart explaining the flow of the image transmission process.

FIG. 10 is an arrow chart explaining the flow of the processing occurring in the image transmission system of FIG. 5 composed of the cameras 101M and 101S.

First, in step S101, the communication block 127 of the camera 101M starts outputting the image signal (i.e., outputs the I-picture heading the coded signal). In step S102, the synchronous signal generation block 128 of the camera 101M generates the synchronous signal.

In step S103, the communication block 127 of the camera 101M transmits the synchronous signal generated by the synchronous signal generation block 128 to the cameras 101S-1 and 101S-2.

Alternatively, the generation or output of the synchronous signal may take place before the camera 101M starts outputting the image signal.

In step S121, the communication block 127 of the camera 101S-1 receives the synchronous signal from the camera 101M. Upon elapse of a predetermined time period (e.g., time T in FIG. 6) following receipt of the synchronous signal in step S121, step S122 is reached and the output timing control block 131 of the camera 101S-1 controls the timing of I-picture output through the communication block 127 so as to start outputting the image signal thereby (i.e., outputting the I-picture heading the image signal).

Likewise, in step S141, the communication block 127 of the camera 101S-2 receives the synchronous signal from the camera 101M. Upon elapse of a predetermined time period (e.g., time 2T in FIG. 6) following receipt of the synchronous signal in step S141, step S142 is reached and the output timing control block 131 of the camera 101S-2 controls the timing of I-picture output through the communication block 127 so as to start outputting the image signal thereby (i.e., outputting the I-picture heading the image signal).

When the steps above are carried out, the transmission timings of the I-pictures from the cameras 101M, 101S-1 and 101S-2 are controlled so as not to overlap with one another. As a result, the transmission load on the coaxial cable 104 is prevented from exceeding the maximum allowable transmission capacity of the cable, with no need to provide the modem 103 with a buffer. This makes it possible to prevent delays and stoppages of image transmission while reducing transmission load.

In the foregoing paragraphs, the camera 101M was described as working as the master and the cameras 101S-1 and 101S-2 as serving as slaves. Alternatively, any one of the cameras 101 may be set to function as the master or a slave. As another alternative, a control device for generating the synchronous signal may be connected to the hub 102 so that this control device may be operated as the master.

<Second Embodiment>

[Typical Configuration of the Image Transmission System]

Figure 11:
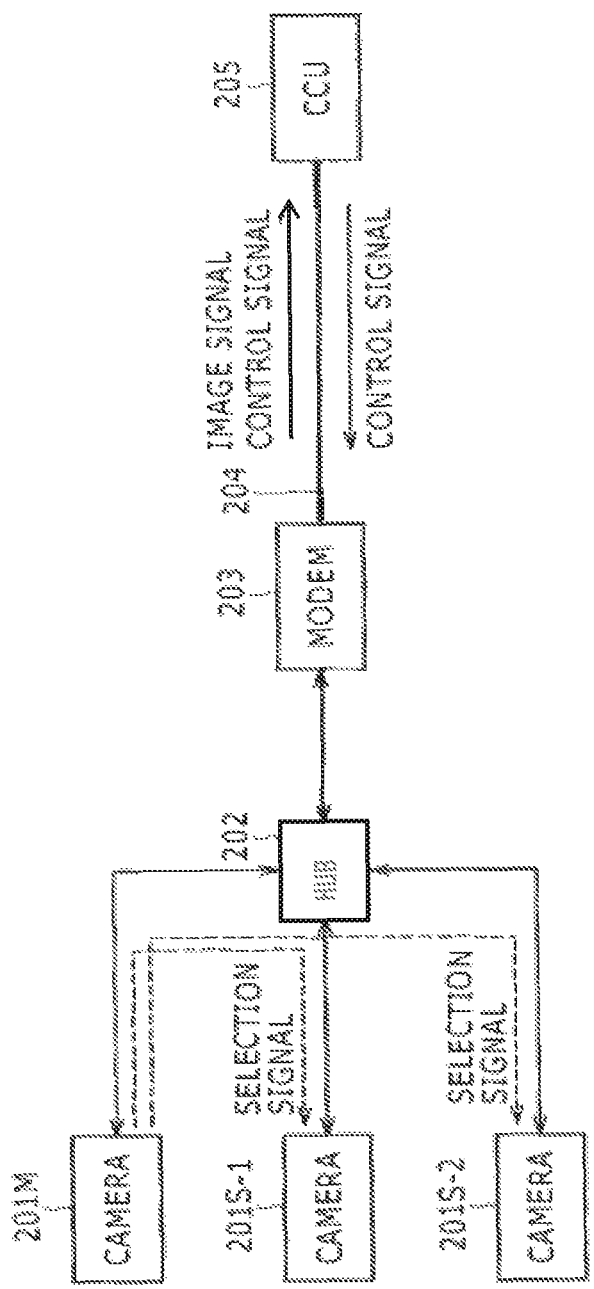
FIG. 11 is a block diagram showing a typical configuration of an image transmission system as a second embodiment of the present technology.

FIG. 11 is a block diagram showing a typical configuration of an image transmission system as the second embodiment of the present technology. The image transmission system in FIG. 11 is made up of cameras 201M, 201S-1 and 201S-2, a hub 202, a modem 203, a coaxial cable 204, and a CCU 205.

The cameras 201M, 201S-1 and 201S-2, hub 202, modem 203, coaxial cable 204, and CCU 205 constituting the image transmission system in FIG. 11 operate basically in the same manner as the cameras 11-1 through 11-3, hub 12, modem 13, coaxial cable 14, and CCU 15 making up the image transmission system in FIG. 3, respectively.

It should be noted that the camera 201M generates a selection signal and sends it to the cameras 201S-1 and 201S-2. The cameras 201S-1 and 201S-2 each control image signal output timing in such a manner as to output the I-picture onto the coaxial cable 204 upon receipt of the selection signal from the camera 201M.

Figure 12:
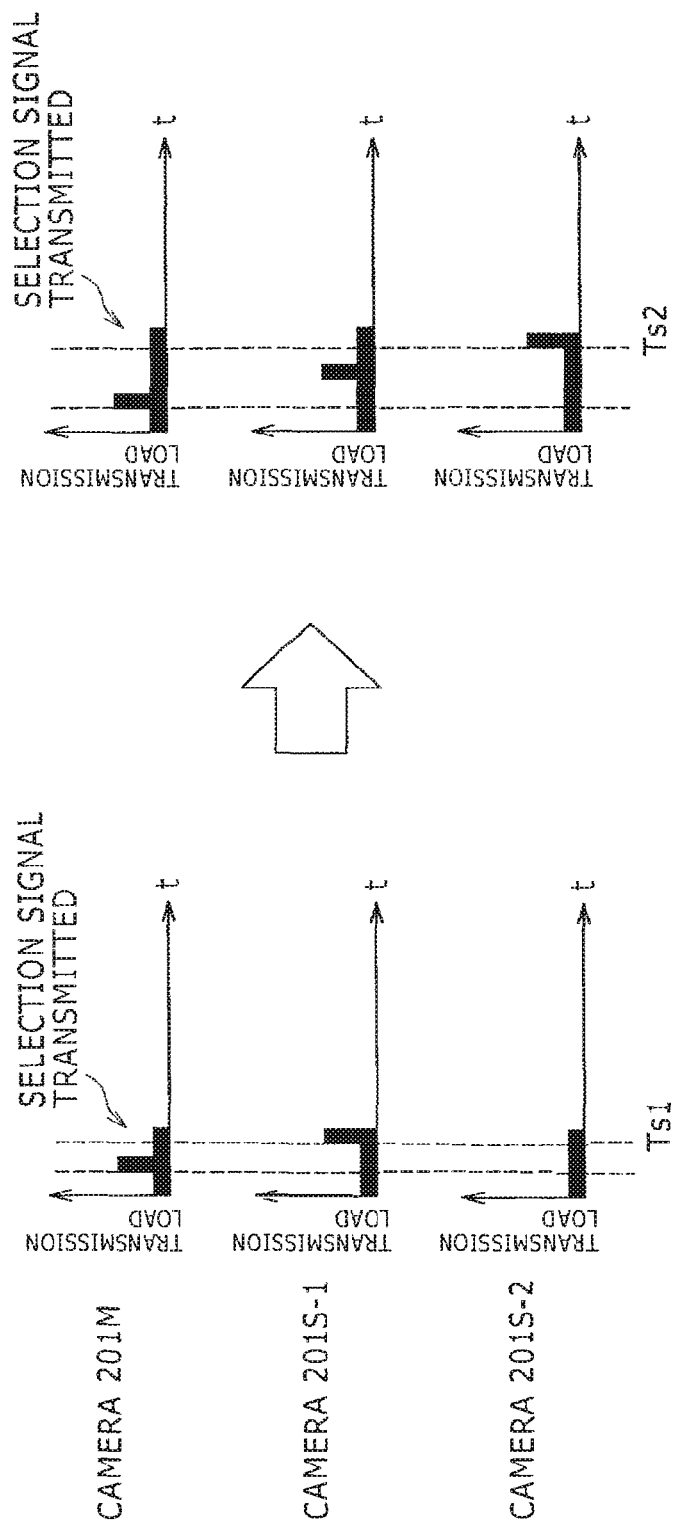
FIG. 12 is an explanatory view explaining the transmission load of the image transmission system shown in FIG. 11.

Specifically, as shown on the left-hand side in FIG. 12, the camera 201M generates the selection signal for selectively allowing another camera to output the I-picture at a predetermined timing (time Ts1) following output of the I-picture onto the coaxial cable 204, and transmits the generated selection signal to the camera 201S-1. At the same time that the selection signal is received from the camera 201M, the camera 201S-1 outputs the I-picture onto the coaxial cable 204.

Also, as shown on the right-hand side in FIG. 12, the camera 201M generates the selection signal for selectively allowing another camera to output the I-picture at a predetermined timing (time Ts2) following output of the I-picture onto the coaxial cable 204, and transmits the generated selection signal to the camera 201S-2. At the same time that the selection signal is received from the camera 201M, the camera 201S-2 outputs the I-picture onto the coaxial cable 204.

As described, the camera 201M operates as the master and the cameras 201S-1 and 201S-2 function as slaves in the image transmission system of FIG. 12. In this manner, the transmission timings of the I-pictures from the cameras 201M, 201S-1 and 201S-2 are controlled so as not to overlap with one another. It is assumed here that the cameras 201M, 201S-1 and 201S-2 have an identical transmission cycle of the I-picture each (i.e., the picture sequence in the GOP is identical).

In the ensuing description, the cameras 201S-1 and 201S-2 will be generically referred to as the camera 201S if there is no need to distinguish the cameras from one another. Likewise, the cameras 201M and 201S will be generically referred to as the camera 201 if there is no need to distinguish these cameras from one another.

[Typical Structure of the Camera]

The typical structure of the camera 201 is explained below in reference to FIGS. 13 and 14. In the camera 201 shown in FIGS. 13 and 14, the structure for receiving control signals from the CCU 205 is not shown, and the description of the structure is omitted herein.

Figure 13:
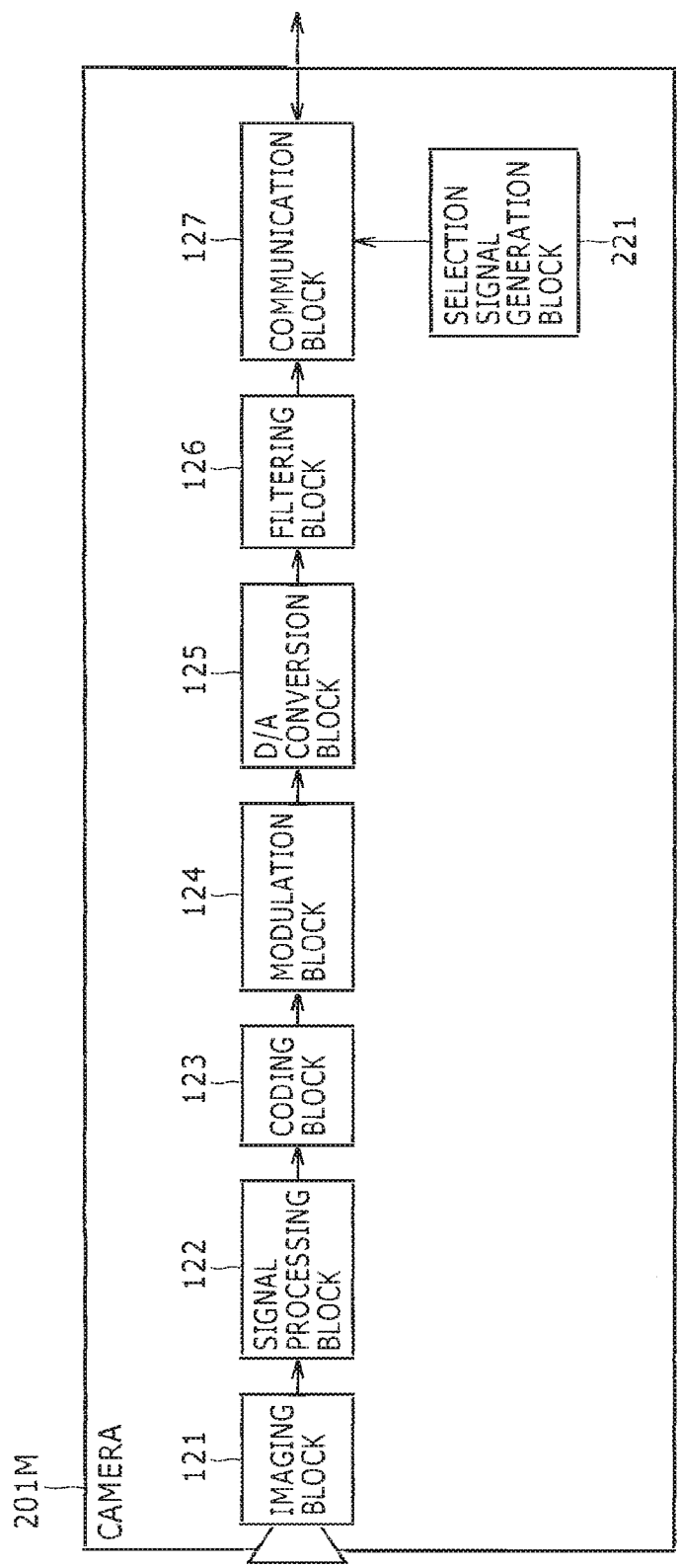
FIG. 13 is a block diagram showing the structure of another camera.

FIG. 13 shows a typical structure of the camera 201M indicated in FIG. 11.

The camera 201M in FIG. 13 is made up of an imaging block 121, a signal processing block 122, a coding block 123, a modulation block 124, a D/A conversion block 125, a filtering block 126, a communication block 127, and a selection signal generation block 221.

Of the components making up the camera 201M in FIG. 13, those offering the same functions as in the camera 101M of FIG. 7 are designated by the same names and reference numerals, and explanations of these components are omitted herein where redundant.

That is, what makes the camera 201M in FIG. 13 different from the camera 101M in FIG. 7 is that the synchronous signal generation block 128 in the camera 101M is replaced with the selection signal generation block 221 in the camera 201M.

The selection signal generation block 221 generates a selection signal to be transmitted to another camera 201, and causes the communication block 127 to transmit the generated selection signal.

Figure 14:
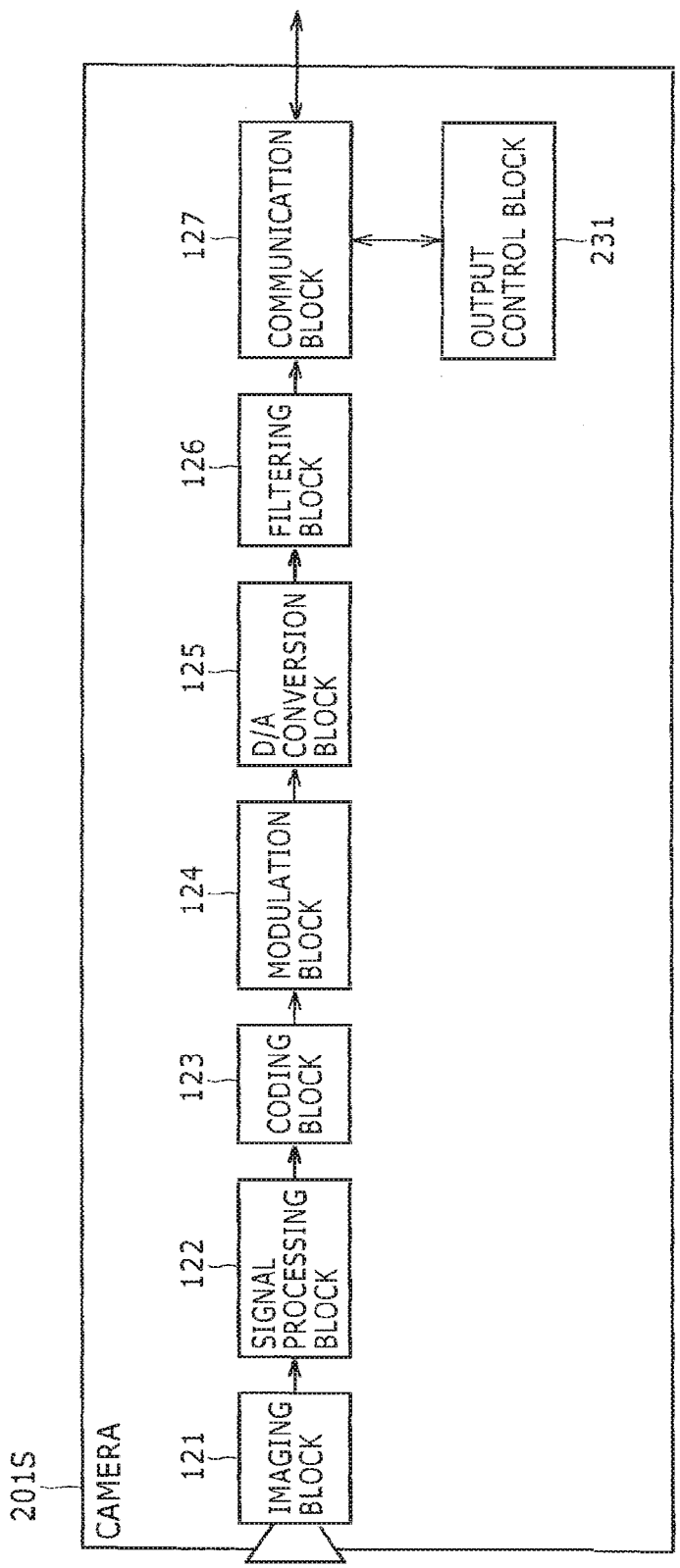
FIG. 14 is a block diagram showing the structure of another camera.

FIG. 14 shows a typical structure of the camera 201S indicated in FIG. 11.

The camera 201S in FIG. 14 is made up of an imaging block 121, a signal processing block 122, a coding block 123, a modulation block 124, a D/A conversion block 125, a filtering block 126, a communication block 127, and an output control block 231.

Of the components making up the camera 201S in FIG. 14, those offering the same functions as in the camera 101M of FIG. 7 are designated by the same names and reference numerals, and explanations of these components are omitted herein where redundant.

That is, what makes the camera 201S in FIG. 14 different from the camera 101M in FIG. 7 is that the synchronous signal generation block 128 in the camera 101M is replaced with the output control block 231 in the camera 201S.

The output control block 231 controls I-picture output in such a manner that the I-picture is output upon receipt by the communication block 127 of the selection signal from the camera 201M.

What follows is an explanation of the flow of the processing taking place in the image transmission system of FIG. 11 made up of the cameras 201M and 201S.

[Flow of Processing in the Image Transmission System]

Figure 15:
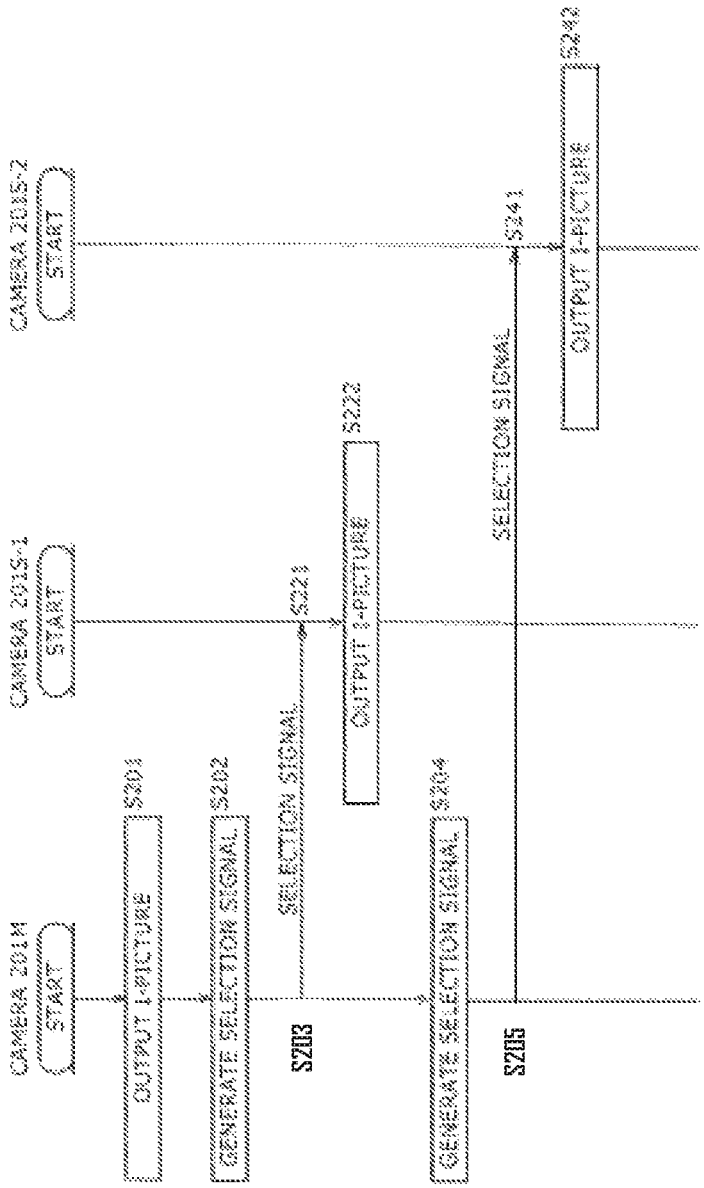
FIG. 15 is an arrow chart explaining the flow of another image transmission process.

FIG. 15 is an arrow chart explaining the flow of the processing occurring in the image transmission system of FIG. 11 composed of the cameras 201M and 201S.

First, in step S201, the communication block 127 of the camera 201M outputs the I-picture. Upon elapse of a predetermined time period following output of the I-picture in step S201, the selection signal generation block 221 of the camera 201M generates a selection signal in step S202.

In step S203, the communication block 127 of the camera 201M transmits the selection signal generated by the selection signal generation block 221 to the camera 201S-1.

In step S221, the communication block 127 of the camera 201S-1 receives the selection signal from the camera 201M. Following receipt of the selection signal in step S221, step S222 is reached and the output control block 231 of the camera 201S-1 controls I-picture output through the communication block 127 to output the I-picture thereby.

Upon elapse of a predetermined time period following output of the I-picture by the communication block 127 of the camera 201M in step S201, step S204 is reached and the selection signal generation block 221 of the camera 201M generates the selection signal.

In step S205, the communication block 127 of the camera 201M transmits the selection signal generated by the selection signal generation block 221 to the camera 201S-2.

In step S241, the communication block 127 of the camera 201S-2 receives the selection signal from the camera 201M. Following receipt of the selection signal in step S241, step S242 is reached and the output control block 231 of the camera 201S-2 controls I-picture output through the communication block 127 to output the I-picture thereby.

When the steps above are carried out, the transmission timings of the I-pictures from the cameras 201M, 201S-1 and 201S-2 are controlled so as not to overlap with one another. As a result, the transmission load on the coaxial cable 204 is prevented from exceeding the maximum allowable transmission capacity of the cable, with no need to provide the modem 203 with a buffer. This makes it possible to prevent delays and stoppages of image transmission while reducing transmission load.

In the foregoing paragraphs, the camera 201M was described as working as the master and the cameras 201S-1 and 201S-2 as serving as slaves. Alternatively, any one of the cameras 201 may be set to function as the master or a slave. As another alternative, a control device for generating the synchronous signal may be connected to the hub 202 so that this control device may be operated as the master.

<Third Embodiment>

[Typical Configuration of the Image Transmission System]

Figure 16:
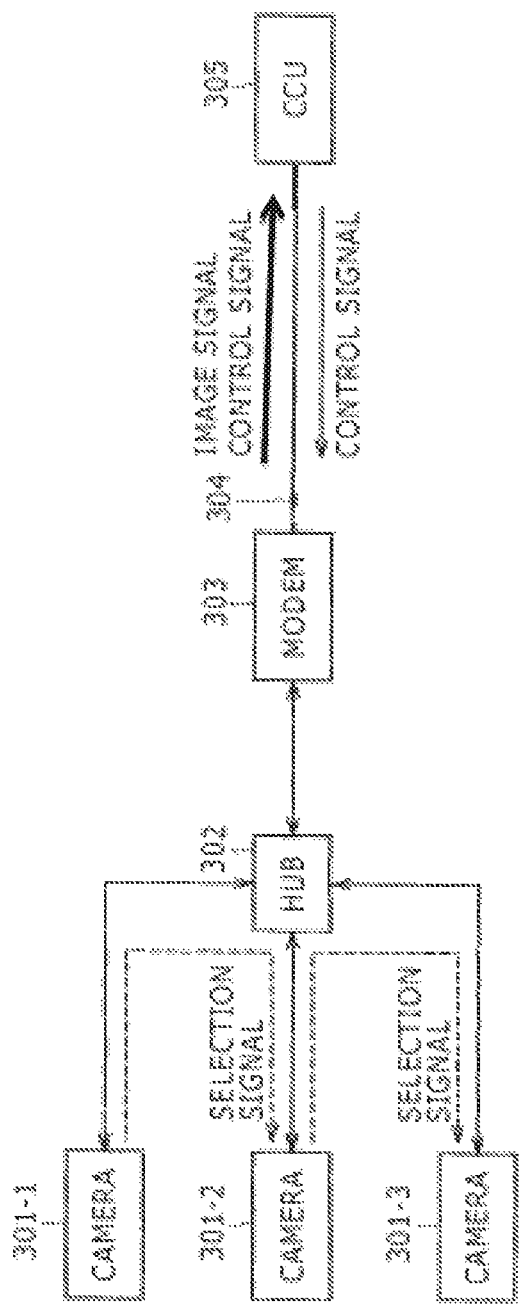
FIG. 16 is a block diagram showing a typical configuration of an image transmission system as a third embodiment of the present technology.

FIG. 16 is a block diagram showing a typical configuration of an image transmission system as the third embodiment of the present technology. The image transmission system in FIG. 16 is made up of cameras 301-1 through 301-3, a hub 302, a modem 303, a coaxial cable 304, and a CCU 305.

The cameras 301-1 through 301-3, hub 302, modem 303, coaxial cable 304, and CCU 305 constituting the image transmission system in FIG. 16 operate basically in the same manner as the cameras 11-1 through 11-3, hub 12, modem 13, coaxial cable 14, and CCU 15 making up the image transmission system in FIG. 3, respectively.

It should be noted that upon receipt of the selection signal from another camera, each of the cameras 301-1 through 301-3 controls image signal output so as to output the I-picture onto the coaxial cable 304 while outputting the selection signal to still another camera.

Figure 17:
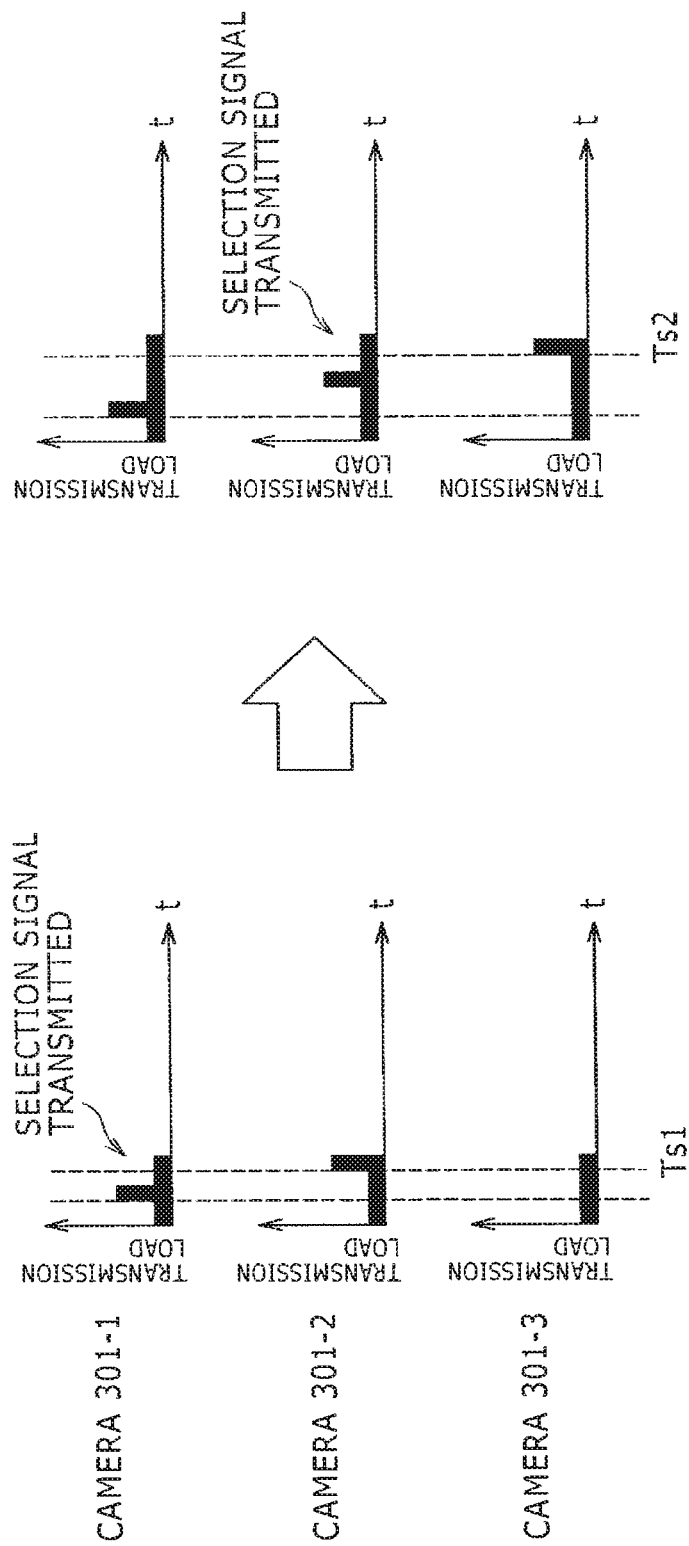
FIG. 17 is an explanatory view explaining the transmission load of the image transmission system shown in FIG. 16.

Specifically, as shown on the left-hand side in FIG. 17, upon elapse of a predetermined time period (time Ts1) following output of the I-picture onto the coaxial cable 304, the camera 301-1 generates the selection signal for selectively allowing another camera to output the I-picture and transmits the generated selection signal to the camera 301-2. At the same time that the selection signal is received from the camera 301-1, the camera 301-2 outputs the I-picture onto the coaxial cable 304.

Also, as shown on the right-hand side in FIG. 17, following output of the I-picture onto the coaxial cable 304, the camera 301-2 generates the selection signal at a predetermined timing (time Ts2) and transmits the generated selection signal to the camera 301-3. At the same time the selection signal is received from the camera 301-2, the camera 301-3 outputs the I-picture onto the coaxial cable 304.

As described, in the image transmission system of FIG. 16, one camera having output the I-picture onto the coaxial cable 304 selectively allows another camera to output the I-picture next onto the coaxial cable 304; the latter camera after outputting the I-picture selectively allows yet another camera to output the I-picture, and the process is repeated. In this manner, the transmission timings of the I-pictures from the cameras 301-1 through 301-3 are controlled so as not to overlap with one another. It is assumed here that the cameras 301-1 through 301-3 have an identical transmission cycle of the I-picture each (i.e., the picture sequence in the GOP is identical).

In the ensuing description, the cameras 301-1 through 301-3 will be generically referred to as the camera 301 if there is no need to distinguish the cameras from one another.

[Typical Structure of the Camera]

The typical structure of the camera 301 is explained below in reference to FIG. 18. In the camera 301 shown in FIG. 18, the structure for receiving control signals from the CCU 305 is not shown, and the description of the structure is omitted herein.

Figure 18:
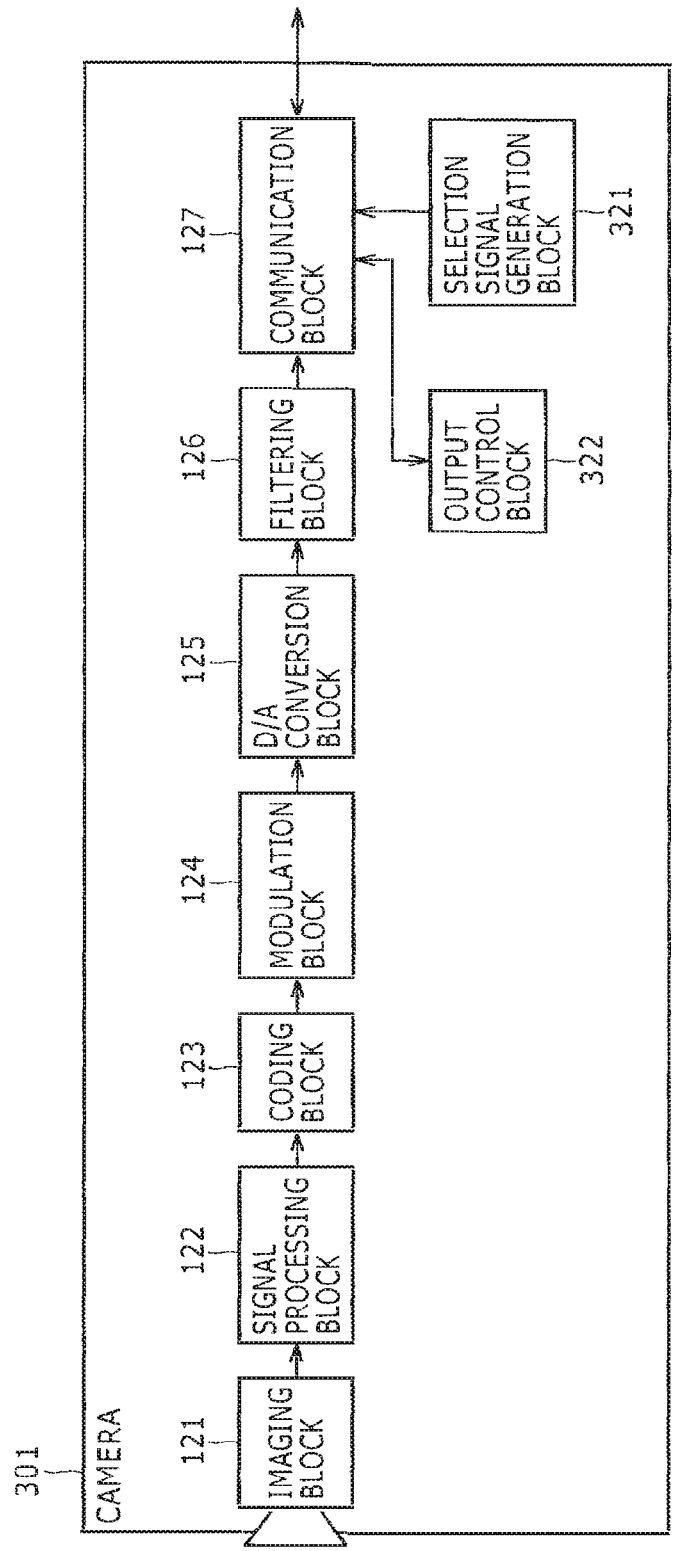
FIG. 18 is a block diagram showing the structure of another camera.

FIG. 18 shows a typical structure of the camera 301 indicated in FIG. 16.

The camera 301 in FIG. 18 is made up of an imaging block 121, a signal processing block 122, a coding block 123, a modulation block 124, a D/A conversion block 125, a filtering block 126, a communication block 127, a selection signal generation block 321, and an output control block 322.

Of the components making up the camera 301 in FIG. 18, those offering the same functions as in the camera 101M of FIG. 7 are designated by the same names and reference numerals, and explanations of these components are omitted herein where redundant.

That is, what makes the camera 301 in FIG. 18 different from the camera 101M in FIG. 7 is that the synchronous signal generation block 128 in the camera 101M is replaced with the selection signal generation block 321 and output control block 322 in the camera 301.

The selection signal generation block 321 generates the selection signal to be transmitted to another camera 301 at a predetermined timing following output by the communication block 127 of the I-picture onto the coaxial cable 304, and causes the communication block 127 to transmit the generated selection signal.

The output control block 322 controls I-picture output to output the I-picture through the communication block 127 onto the coaxial cable 304 upon receipt of the selection signal from another camera 301.

What follows is an explanation of the flow of the processing taking place in the image transmission system of FIG. 16 made up of the cameras 301.

[Flow of Processing in the Image Transmission System]

Figure 19:
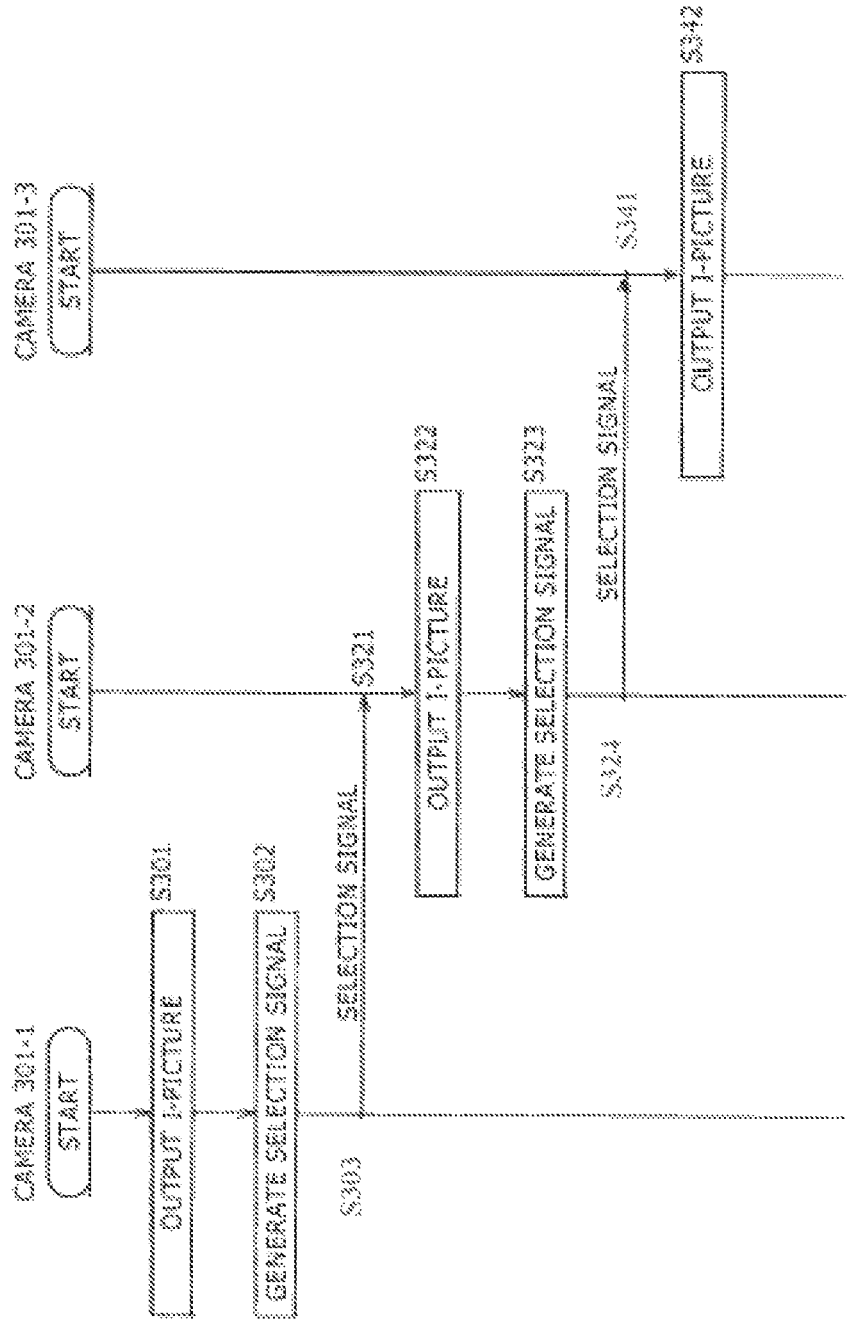
FIG. 19 is an arrow chart explaining the flow of another image transmission process.

FIG. 19 is an arrow chart explaining the flow of the processing occurring in the image transmission system of FIG. 16 composed of the cameras 301-1 through 301-3.

First, in step S301, the communication block 127 of the camera 301-1 outputs the I-picture onto the coaxial cable 304. Upon elapse of a predetermined time period following output of the I-picture in step S301, the selection signal generation block 321 of the camera 301-1 generates a selection signal in step S302.

In step S303, the communication block 127 of the camera 301-1 transmits the selection signal generated by the selection signal generation block 321 to the camera 301-2.

In step S321, the communication block 127 of the camera 301-2 receives the selection signal from the camera 301-1. Following receipt of the selection signal in step S321, step S322 is reached and the output control block 322 of the camera 301-2 controls I-picture output through the communication block 127 to output the I-picture thereby onto the coaxial cable 304.

Upon elapse of a predetermined time period following output of the I-picture through the communication block 127 of the camera 301-2 onto the coaxial cable 304 in step S322, step S323 is reached and the selection signal generation block 321 of the camera 301-2 generates the selection signal.

In step S324, the communication block 127 of the camera 301-2 transmits the selection signal generated by the selection signal generation block 321 to the camera 301-3.

In step S341, the communication block 127 of the camera 301-3 receives the selection signal from the camera 301-2. Following receipt of the selection signal in step S341, step S342 is reached and the output control block 322 of the camera 301-3 controls I-picture output through the communication block 127 to output the I-picture thereby.

Although not shown, upon elapse of a predetermined time period following output of the I-picture onto the coaxial cable 304 through the communication block 127 of the camera 301-3, the selection signal generation block 321 of the camera 301-3 generates the selection signal and transmits the generated selection signal to the camera 301-1. Upon receipt of the selection signal from the camera 301-3, the camera 301-1 outputs the I-picture onto the coaxial cable 304. The process above is repeated thereafter.

When the steps above are carried out, the transmission timings of the I-pictures from the cameras 301-1 through 301-3 are controlled so as not to overlap with one another. As a result, the transmission load on the coaxial cable 304 is prevented from exceeding the maximum allowable transmission capacity of the cable, with no need to provide the modem 303 with a buffer. This makes it possible to prevent delays and stoppages of image transmission while reducing transmission load.

Figure 20:
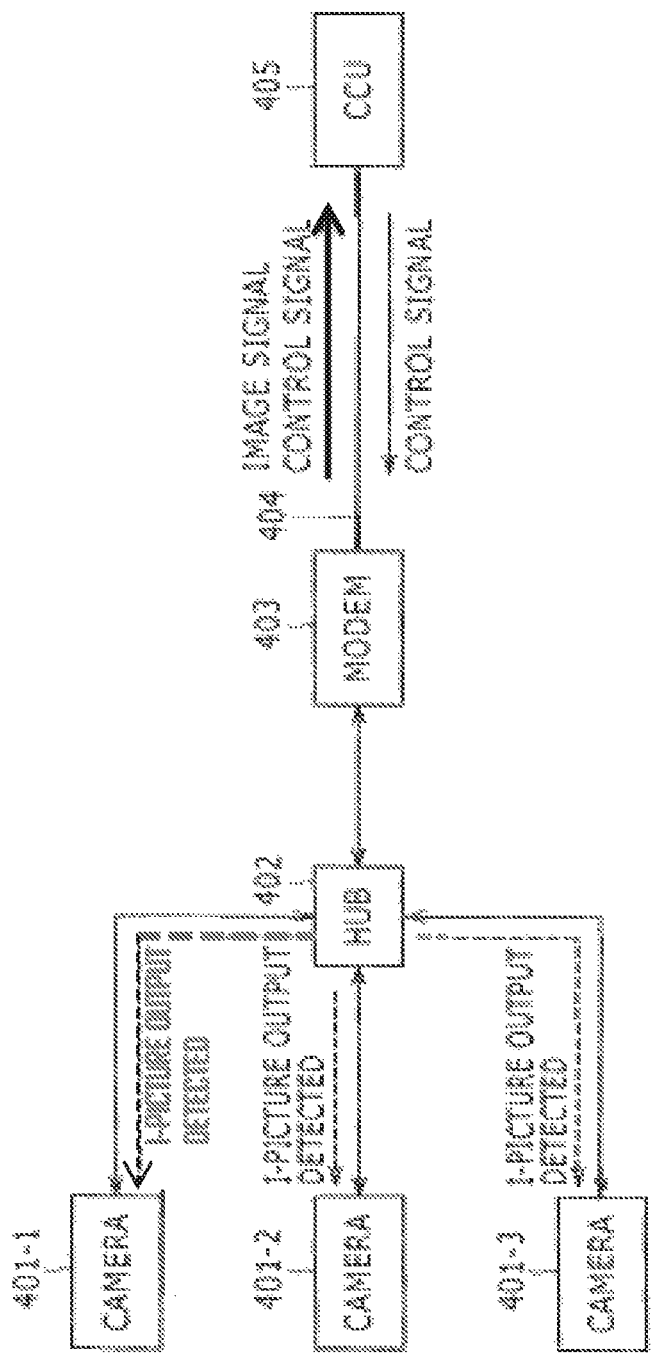
FIG. 20 is a block diagram showing a typical configuration of an image transmission system as a fourth embodiment of the present technology.

<Fourth Embodiment>
[Typical Configuration of the Image Transmission System]
FIG. 20 is a block diagram showing a typical configuration of an image transmission system as the fourth embodiment of the present technology. The image transmission system in FIG. 20 is made up of cameras 401-1 through 401-3, a hub 402, a modem 403, a coaxial cable 404, and a CCU 405.

The cameras 401-1 through 401-3, hub 402, modem 403, coaxial cable 404, and CCU 405 constituting the image transmission system in FIG. 20 operate basically in the same manner as the cameras 11-1 through 11-3, hub 12, modem 13, coaxial cable 14, and CCU 15 making up the image transmission system in FIG. 3, respectively.

It should be noted that the cameras 401-1 through 401-3 each keep monitoring the transmission load (transmission capacity) of the image signals being output onto the coaxial cable 404 to detect I-picture output by any other camera. In so doing, each camera controls its image signal output in such a manner as to output the I-picture onto the coaxial cable 404 when I-picture output from any other camera is not being detected.

Figure 21:
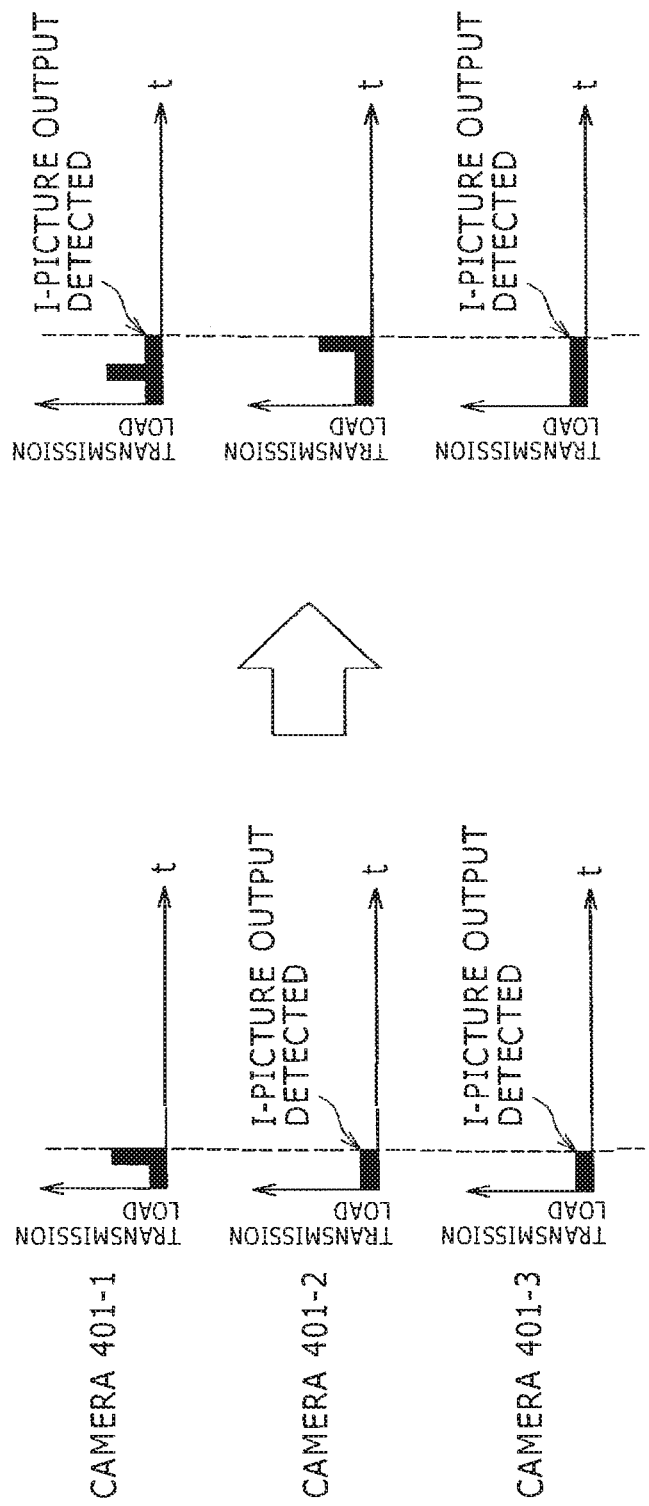
FIG. 21 is an explanatory view explaining the transmission load of the image transmission system shown in FIG. 20.

Specifically, as shown on the left-hand side in FIG. 21, when the camera 401-1 outputs the I-picture onto the coaxial cable 404, the cameras 401-2 and 401-3 detect such I-picture output from the camera 401-1 and thus enter a standby state for I-picture output.

Thereafter, upon elapse of a predetermined time period with none of the cameras detected to output its I-picture, the camera 401-2 outputs the I-picture onto the coaxial cable 404 as shown on the right-hand side in FIG. 21. When the camera 401-2 outputs the I-picture, the cameras 401-1 and 401-3 detect such I-picture output from the camera 401-2 and thus enter a standby state for I-picture output.

As described, in the image transmission system of FIG. 21, each of the cameras 401-1 through 401-3 enters a standby state for I-picture output when any other camera outputs its I-picture. In this manner, the transmission timings of the I-pictures from the cameras 401-1 through 401-3 are controlled so as not to overlap with one another. It is assumed here that the cameras 401-1 through 401-3 have an identical transmission cycle of the I-picture each (i.e., the picture sequence in the GOP is identical).

In the ensuing description, the cameras 401-1 through 401-3 will be generically referred to as the camera 401 if there is no need to distinguish the cameras from one another.

[Typical Structure of the Camera]
The typical structure of the camera 401 is explained below in reference to FIG. 22. In the camera 401 shown in FIG. 22, the structure for receiving control signals from the CCU 405 is not shown, and the description of the structure is omitted herein.

Figure 22:
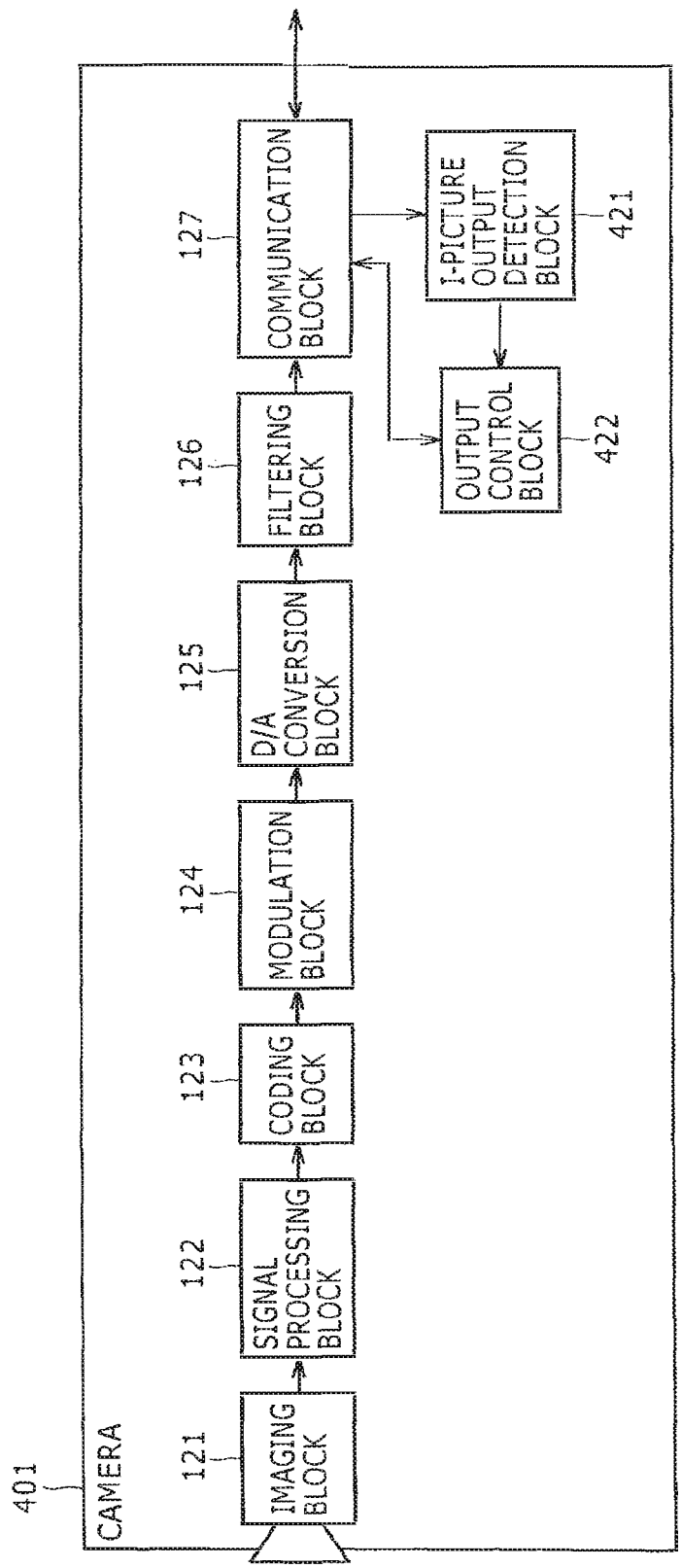
FIG. 22 is a block diagram showing the structure of another camera.

FIG. 22 shows a typical structure of the camera 401 indicated in FIG. 20.

The camera 401 in FIG. 22 is made up of an imaging block 121, a signal processing block 122, a coding block 123, a modulation block 124, a D/A conversion block 125, a filtering block 126, a communication block 127, an I-picture output detection block 421, and an output control block 422.

Of the components making up the camera 401 in FIG. 22, those offering the same functions as in the camera 101M of FIG. 7 are designated by the same names and reference numerals, and explanations of these components are omitted herein where redundant.

That is, what makes the camera 401 in FIG. 22 different from the camera 101M in FIG. 7 is that the synchronous signal generation block 128 in the camera 101M is replaced with the I-picture output detection block 421 and output control block 422 in the camera 401.

The I-picture output detection block 421 detects output of the I-picture by any other camera 401 onto the coaxial cable 404, and supplies the result of the detection in an appropriate manner to the output control block 422.

Based on the result of the detection from the I-picture output detection block 421, the output control block 422 detects whether the I-picture is output from any other camera 401. When the output of the I-picture from any other camera is not being detected, the output control block 422 controls I-picture output in such a manner that the communication block 127 outputs the I-picture onto the coaxial cable 404.

What follows is an explanation of the flow of the processing taking place in the image transmission system of FIG. 22 made up of the cameras 401.

Figure 23:
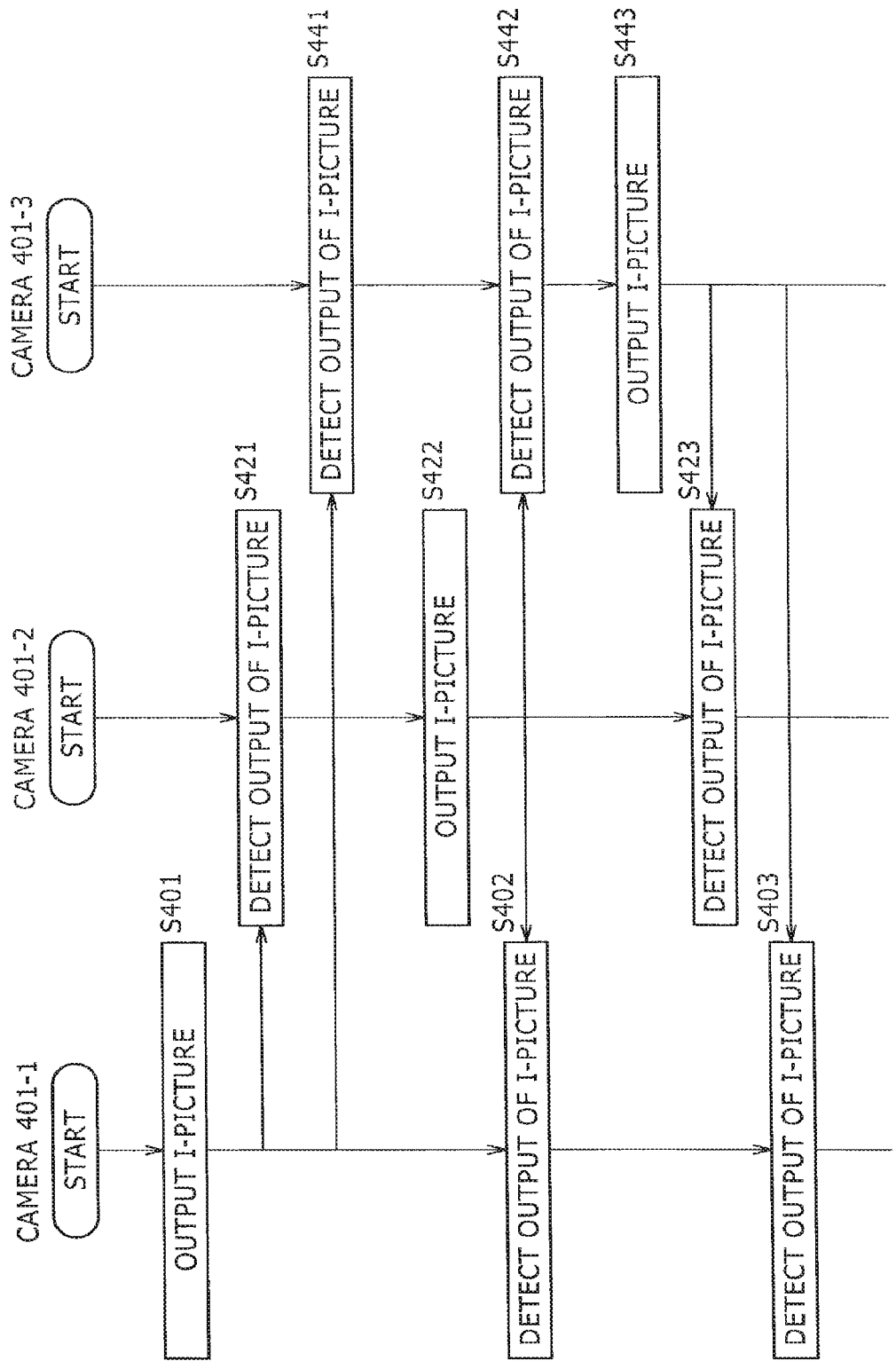
FIG. 23 is an arrow chart explaining the flow of another image transmission process.

[Flow of Processing in the Image Transmission System]
FIG. 23 is an arrow chart explaining the flow of the processing occurring in the image transmission system of FIG. 22 composed of the cameras 401-1 through 401-3.

First, in step S401, the communication block 127 of the camera 401-1 outputs the I-picture onto the coaxial cable 404. At this point, the cameras 401-2 and 401-3 are each in a standby state for I-picture output.

In step S421, the camera 401-2 detects I-picture output from the camera 401-1 and thus continues its standby state for I-picture output. In step S441, the camera 401-3 detects I-picture output from the camera 401-1 and likewise continues its standby state for I-picture output. Also, the camera 401-1 enters a standby state for I-picture output.

The cameras 401-1 through 401-3 are each set with a standby time to pass before the next I-picture is output following output of the current I-picture. Upon elapse of the standby time in which no other camera 401 outputs its I-picture following entry into the standby state for I-picture output, the output control block 422 controls I-picture output to output the I-picture onto the coaxial cable 404. If I-picture output from some other camera 401 is detected after the standby state for I-picture output is entered, the I-picture will not be output until the next standby time elapses.

That is, the output control block 422 of the camera 401-2 detects I-picture output from the camera 401-1 in step S421 and allows the standby time to pass. Upon elapse of the standby time, step S422 is reached and the output control block 422 controls the communication block 127 to output the I-picture.

At this point, the camera 401-1 reaches step S402 to detect I-picture output from the camera 401-2 and thus continues the standby state for I-picture output. In step S442, the camera 401-3 detects I-picture output from the camera 401-2 and likewise continues the standby state for I-picture output. Also, the camera 401-2 enters a standby state for I-picture output.

Then the output control block 422 of the camera 401-3 detects I-picture output from the camera 401-2 in step S442 and allows the standby time to pass. Upon elapse of the standby time, step S443 is reached and the output control block 422 controls the communication block 127 to output the I-picture.

At this point, the camera 401-1 reaches step S403 to detect I-picture output from the camera 401-3 and thus continues the standby state for I-picture output. In step S423, the camera 401-2 detects I-picture output from the camera 401-3 and likewise continues the standby state for I-picture output. Also, the camera 401-3 enters a standby state for I-picture output.

Although not shown, upon elapse of the standby time following detection of I-picture output from the camera 401-3 in step S403, the camera 401-1 outputs the I-picture onto the coaxial cable 404. The above process is repeated thereafter.

When the steps above are carried out, the transmission timings of the I-pictures from the cameras 401-1 through 401-3 are controlled so as not to overlap with one another. As a result, the transmission load on the coaxial cable 404 is prevented from exceeding the maximum allowable transmission capacity of the cable, with no need to provide the modem 403 with a buffer. This makes it possible to prevent delays and stoppages of image transmission while reducing transmission load.

Since there is no need to furnish the modem with a buffer in the above image transmission system implemented to embody the present technology as described, it is possible to reduce the costs of the components involved.

Furthermore, the image transmission system implemented as described above makes it possible to transmit the image signals from a plurality of cameras over a single transmission path (e.g., coaxial cable). As a result, in surveillance camera systems in which a very large number of surveillance cameras need to be set up, the number of coaxial cables serving as transmission paths can be reduced.

The reduction in the number of coaxial cables further provides the following advantageous effects:

(1) The reduction in the number of the transmission paths in use contributes to reducing the number of reception devices configured such as CCUs and to simplifying the structure of the reception device itself.

(2) The reduction in the number of the transmission paths needed allows excess transmission paths to be appropriated for other purposes.

(3) The reduction in the number of the transmission paths in use helps reduce the space necessary for installing these transmission paths, thereby allowing the vacated space to be otherwise utilized effectively.

(4) The reduction in the number of the transmission paths in use helps reduce human errors such as erroneous connections of coaxial cables.

(5) The reduction in the number of the transmission paths in use contributes to lowering the level of noise stemming from the presence of the transmission paths.

Moreover, the image transmission system implemented as described above helps reduce pulsating fluctuations in transmission load. Compared with ordinary image transmission systems in which transmission capacity is boosted by enlarging the frequency band used without recourse to a buffer attached to the modem, the image transmission system embodying the present technology can reduce the frequency band to be used so that the frequency band may be otherwise utilized effectively.

Although the above image transmission system was described as having three cameras configured, this is not limitative of the present technology. Alternatively, the system may have more than or fewer than three cameras configured as long as there are a plurality of cameras involved.

In this specification, the term "system" refers to an aggregate of a plurality of components (devices or modules (parts)). It does not matter whether or not all components are housed in the same enclosure. Thus a system may be configured with a plurality of devices housed in separate enclosures and interconnected via a network, as well as with a single device that houses a plurality of modules in a single enclosure.

Also, it should be understood that this technology when embodied is not limited to the above-described embodiments and that various modifications, variations and alternatives may be made of this technology so far as they are within the spirit and scope thereof.

For example, the present technology may be configured as a cloud computing setup in which a single function is processed cooperatively by a plurality of devices on a sharing basis through a network.

Also, each of the steps explained in reference to the above-described flowcharts may be carried out either by a single device or by a plurality of devices on a sharing basis.

Furthermore, if a plurality of processes are included in a single step, these processes may be carried out either by a single device or by a plurality of devices on a sharing basis.

The present technology may also be configured as follows:

(1) An image transmission system including a plurality of cameras and a coaxial cable for transmitting image signals from the cameras, wherein
   each of the cameras includes
   an imaging block configured to acquire an image signal by imaging an object,
   a coding block configured to compression-code the image signal through intra-frame compression and inter-frame compression so as to generate a coded signal, and
   a signal output block configured to output the coded signal onto the coaxial cable; and
   the camera of interest outputs the coded signal obtained through inter-frame compression onto the coaxial cable when another of the cameras outputs the coded signal obtained through intra-frame compression onto the coaxial cable.

(2) The image transmission system as described in paragraph (1) above, wherein
   one of the cameras further includes a synchronous signal generation block configured to generate a synchronous signal to be transmitted to the other cameras, and
   the other cameras each include an output timing control block configured to control signal output timing in such a manner that the coded signal obtained through intra-frame compression is output onto the coaxial cable upon elapse of a predetermined time period following receipt of the synchronous signal from the one camera.

(3) The image transmission system as described in paragraph (1) above, wherein
one of the cameras further includes a selection signal generation block configured to generate a selection signal for selectively allowing another of the cameras to output the coded signal obtained through intra-frame compression onto the coaxial cable, and
the other cameras each include an output control block configured to control signal output in such a manner that the coded signal obtained through intra-frame compression is output onto the coaxial cable upon receipt of the selection signal from the one camera.

(4) The image transmission system as described in paragraph (1) above, wherein each of the cameras includes:
an output control block configured to perform output control in such a manner that upon receipt of a selection signal from another of the cameras for selectively allowing the camera of interest to output the coded signal obtained through intra-frame compression onto the coaxial cable, the coded signal obtained through intra-frame compression is output onto the coaxial cable, and
a selection signal generation block configured to generate the selection signal for selectively allowing still another of the cameras to output the coded signal obtained through intra-frame compression onto the coaxial cable.

(5) The image transmission system as described in paragraph (1) above, wherein each of the cameras includes:
an output detection block configured to detect the output by another of the cameras of the coded signal obtained through intra-frame compression onto the coaxial cable, and
an output control block configured to control signal output in such a manner that when the output by another of the cameras of the coded signal obtained through intra-frame compression onto the coaxial cable is not detected, the coded signal obtained through intra-frame compression is output onto the coaxial cable.

(6) The image transmission system as described in any one of paragraphs (1) through (5) above, wherein
the coding block generates the coded signal composed of an I-picture, a P-picture, and a B-picture by compression-coding the image signal in MPEG format, the MPEG denoting Moving Picture Experts Group, and
the camera of interest outputs either the P-picture or the B-picture onto the coaxial cable when another of the cameras outputs the I-picture onto the coaxial cable.

(7) An image transmission method for use with an image transmission system including a plurality of cameras and a coaxial cable for transmitting image signals from the cameras, each of the cameras including
an imaging block configured to acquire an image signal by imaging an object,
a coding block configured to compression-code the image signal through intra-frame compression and inter-frame compression so as to generate a coded signal, and
a signal output block configured to output the coded signal onto the coaxial cable,
the image transmission method including
causing the camera of interest to output the coded signal obtained through inter-frame compression onto the coaxial cable when another of the cameras outputs the coded signal obtained through intra-frame compression onto the coaxial cable.

It should be understood by those skilled in the art that various modifications, combinations, sub-combinations and alternations may occur depending on design requirements and other factors insofar as they are within the scope of the appended claims or the equivalent thereof.

The present technology contains subject matter related to that disclosed in Japanese Priority Patent Application JP 2012-058874 filed in the Japan Patent Office on Mar. 15, 2012, the entire content of which is hereby incorporated by reference.

The invention claimed is:

1. An image transmission system, comprising:
a first camera of a plurality of cameras, wherein the first camera is configured to generate a first coded signal by compression-coding a first image signal through one of intra-frame compression or inter-frame compression;
a synchronous signal generation circuit of a second camera of the plurality of cameras, wherein the synchronous signal generation circuit is configured to generate a synchronous signal that is transmitted to the first camera of the plurality of cameras; and
a control circuit of the first camera of the plurality of cameras,
wherein the control circuit is configured to output a picture heading the first coded signal, based on the synchronous signal.

2. The image transmission system according to claim 1, wherein each of the plurality of cameras includes an imaging circuit configured to acquire a corresponding image signal by imaging an object.

3. The image transmission system according to claim 1, wherein each of the plurality of cameras includes a coding circuit configured to generate a corresponding coded signal.

4. The image transmission system according to claim 1, wherein each of the plurality of cameras includes a signal output circuit configured to output a corresponding coded signal.

5. The image transmission system according to claim 1, further comprising a coaxial cable that connects the first camera to the second camera.

6. The image transmission system according to claim 1, wherein the first camera is configured to output the first coded signal obtained through the intra-frame compression after a time period following receipt of the synchronous signal from the second camera.

7. The image transmission system according to claim 1, wherein the picture heading the first coded signal is an I-picture.

8. The image transmission system according to claim 1, wherein the first camera of the plurality of cameras further includes a selection signal generation circuit configured to generate a first selection signal to control the second camera of the plurality of cameras to output a second coded signal obtained through the intra-frame compression, and
wherein the second camera includes an output control circuit configured to control the second camera to output the second coded signal obtained through the intra-frame compression upon receipt of the first selection signal from the first camera.

9. The image transmission system according to claim 1, wherein the control circuit is further configured to control, upon receipt of a first selection signal from a third camera of the plurality of cameras to control the first camera to output the first coded signal obtained through the intra-frame compression, the output of the first coded signal obtained through the intra-frame compression, and
wherein the first camera further comprises of a selection signal generation circuit configured to generate a second selection signal to control a fourth camera of the plurality of cameras to output a corresponding third coded signal obtained through the intra-frame compression.

10. The image transmission system according to claim 1, wherein each camera of the plurality of cameras further includes:
   an output detection circuit configured to detect an output, by a third camera of the plurality of cameras, of second coded signal obtained through the intra-frame compression, and
   an output control circuit configured to control, when the output of the second coded signal obtained through the intra-frame compression is not detected, output of a corresponding coded signal obtained through intra-frame compression.

11. The image transmission system according to claim 1, wherein the first coded signal generated by a first coding circuit includes an l-picture, a P-picture, and a B-picture,
   wherein the first coding circuit configured to generate the first coded signal by compression-coding the first image signal in a Moving Picture Experts Group (MPEG) format, and
   wherein a camera of interest from the plurality of cameras is configured to output either the P-picture or the B-picture onto a coaxial cable when a third camera of the plurality of cameras outputs the I-picture.

12. An image transmission method by a first camera of a plurality of cameras in an image transmission system, the image transmission method comprising:
   generating a coded signal by compression-coding an image signal through one of intra-frame compression or inter-frame compression;
   receiving a synchronous signal that is transmitted from a second camera of the plurality of cameras; and
   outputting a picture heading the coded signal based on the received synchronous signal.

13. An apparatus, comprising:
   circuitry configured to generate a coded signal by compression-coding an image signal through one of intra-frame compression or inter-frame compression;
   receive a synchronous signal that is transmitted from a second camera of a plurality of cameras; and
   output a picture heading the coded signal based on the received synchronous signal.

* * * * *